US005245361A

United States Patent [19]

Kashimura et al.

[11] Patent Number: 5,245,361

[45] Date of Patent: Sep. 14, 1993

[54] MOUNTAIN ARRANGEMENT FOR POSITIONING AN INK JET RECORDING HEAD WITH INTEGRAL INK TANK WHEN THE HEAD IS MOUNTED TO A CARRIAGE

[75] Inventors: Makoto Kashimura, Tokyo; Toshihiko Bekki, Kawasaki; Hirofumi Hirano, Yokohama; Tetsuo Kimura, Sagamihara, all of Japan

[73] Assignee: Canon Kabushiki Kaisha, Tokyo, Japan

[21] Appl. No.: 458,539

[22] Filed: Dec. 28, 1989

[30] Foreign Application Priority Data

| | | | |
|---|---|---|---|
| Dec. 29, 1988 | [JP] | Japan | 63-330981 |
| Dec. 29, 1988 | [JP] | Japan | 63-330996 |
| Jan. 17, 1989 | [JP] | Japan | 1-008076 |

[51] Int. Cl.[5] ...................... G01D 15/00; G01D 15/16

[52] U.S. Cl. ................................ 346/140 R; 346/145

[58] Field of Search ...................... 346/140 R, 75, 145

[56] References Cited

U.S. PATENT DOCUMENTS

| | | | |
|---|---|---|---|
| 4,144,537 | 3/1979 | Kimura et al. | 346/140 R |
| 4,599,625 | 7/1986 | Terasawa et al. | 346/140 R |
| 4,600,931 | 7/1986 | Terasawa | 346/140 R |
| 4,630,078 | 12/1986 | Watanabe | 346/140 R |
| 4,633,274 | 12/1986 | Matsuda | 346/140 R |
| 4,635,080 | 1/1987 | Watanabe | 346/140 R |
| 4,660,056 | 4/1987 | Yokoi | 346/140 R |
| 4,695,855 | 9/1987 | Ichihashi et al. | 346/145 |
| 4,712,172 | 12/1987 | Kiyohara et al. | 346/1.1 |
| 4,727,384 | 2/1988 | Tsuda | 346/140 R |
| 4,736,213 | 4/1988 | Piatt et al. | 346/140 R |
| 4,755,836 | 7/1988 | Ta et al. | 346/140 R |
| 4,775,871 | 10/1988 | Abe et al. | 346/140 R |
| 4,806,106 | 2/1989 | Mebane et al. | 439/77 |
| 4,872,026 | 10/1989 | Rasmussen et al. | 346/140 R |
| 4,907,018 | 7/1990 | Pinkerpell et al. | 346/139 R |

OTHER PUBLICATIONS

Samelson et al., "Rubbers and Elastomer Materials and Compounds," Insulation Circuits Directory Encyclopedia, vol. 16, No. 7, Jul. 1970, p. 164.

*Primary Examiner*—Benjamin R. Fuller
*Assistant Examiner*—David Yockey
*Attorney, Agent, or Firm*—Fitzpatrick, Cella, Harper & Scinto

[57] ABSTRACT

In an ink jet recording device having an ink tank integrated type jet recording head and a carriage for mounting the head thereon, good electrical connection is obtained wherein the electrical pad of the connecting terminal of the recording head and the electrical pad of the connecting terminal of the carriage are connected to each other while rubbing against one another. Further, also by specifying the arrangement position of the positioning member, more accurate electrical conduction is effected and also breaking of the positioning member is prevented, thereby providing an ink jet recording device having high reliability in aspects of both recording and durability.

15 Claims, 25 Drawing Sheets

FIG. 1A
PRIOR ART
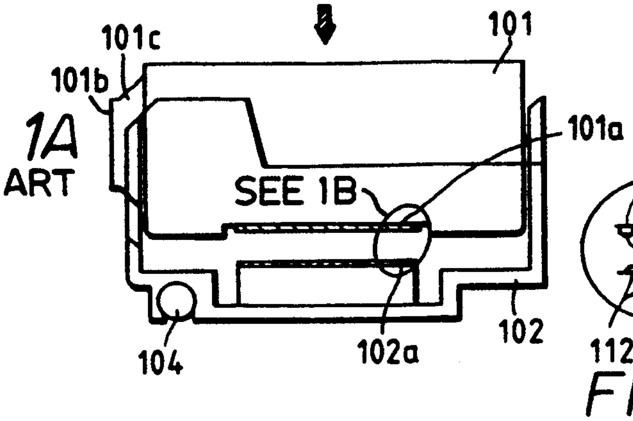
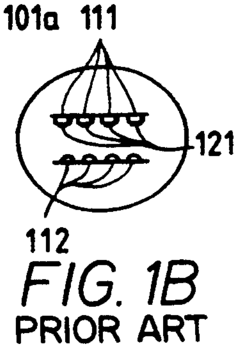
FIG. 1B
PRIOR ART
FIG. 2A
PRIOR ART
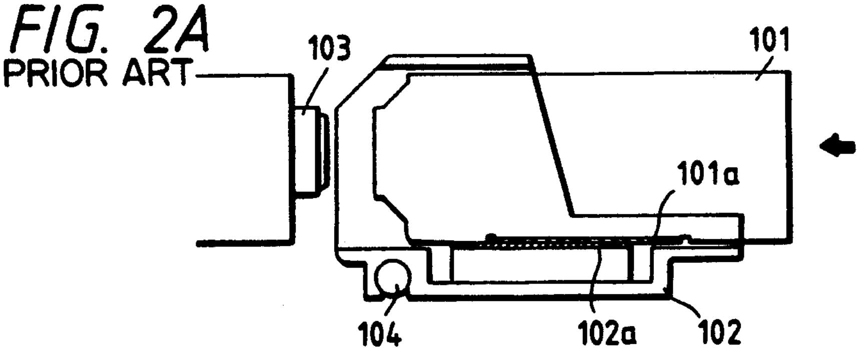
FIG. 2B
PRIOR ART
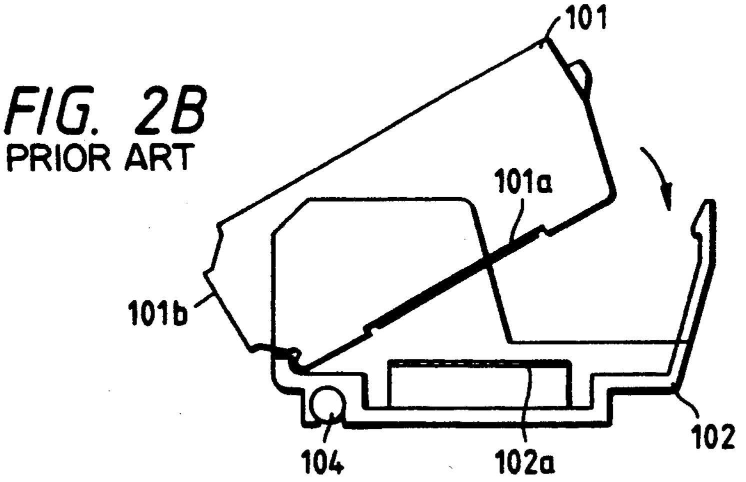

MOUNTAIN ARRANGEMENT FOR POSITIONING AN INK JET RECORDING HEAD WITH INTEGRAL INK TANK WHEN THE HEAD IS MOUNTED TO A CARRIAGE

BACKGROUND OF THE INVENTION

1. Field of the Invention

This invention relates to an ink jet recording apparatus to be employed for copying device, facsimile, word processor, video output printer, output printer of computer, etc., particularly to a constitution for mounting a recording head equipped integrally with an ink tank for containing ink freely detachably onto the carriage as the recording head mounting means.

2. Related Background Art

Of the ink jet recording apparatus, there has been known one using an ink jet recording head such as disposable head comprising internally an integrated combination of an ink tank for housing ink which is a recording medium and a recording head element having the function of discharging ink (hereinafter called recording head or ink jet recording head cartridge).

Examples of the mounting methods of such recording heads are described in U.S. Pat. No. 4,599,625 (Terasawa et al), U.S. Pat. No. 4,630,078 (Watanabe), U.S. Pat. No. 4,633,274 (Matsuda), U.S. Pat. No. 4,635,080 (Watanabe), U.S. Pat. No. 4,712,172 (Kiyohara et al), U.S. Pat. No. 4,727,384 (Tsuda), etc.

In mounting such recording head onto the carriage on the main body side of the recording device, since recording must be performed by attaching ink accurately to the adequate position on the recording paper, and the connecting terminal for transmitting recording signals adequately, it has been required to fix and mount the recording head at an adequate position.

To classify broadly the mounting methods of recording heads, there may be included the methods in which the ink cartridge is mounted from above or behind the carriage in parallel or by simple rotation.

As an example which performs mounting simply, there is such constitution as shown in FIG. 1; 101 is a recording head of the type integrated with an ink tank, having a connecting terminals 101*a* having a plurality of electrical pads 111 and a discharge port surface of the ink recording head element 101*c* provided at the bottom. The carriage 102 is provided with a connecting terminal 102*a* for transmitting recording signals to the recording head. Here, 102*a* is constituted of a plurality of electrical pads 112 and 104 is a guide shaft for guiding movement of the carriage 102. Thus, when the recording head is mounted from above the carriage, attachment and detachment can be done very easily, but since the connecting terminals 101*a* and 102*a* are not rubbed with each other during mounting and therefore, if there was a coating or a foreign matter due to ink contamination interposed between the connecting terminals, defective connection sometimes occurred. Also, an unused recording head may sometimes have a very thin insulating protective film 121 provided for protection of connecting terminals. Then, in the case of such mounting method, there is no action of ensuring connection by scraping off the protective film. Therefore, this example could never be said as the optimum example as the connecting method of signal terminals. Also, in commencing use after mounting an unused recording head, it is necessary to form immediately the state where ink can be well discharged by means of a discharge restoration means, etc.

Accordingly, the present invention entails attaching and detaching the recording head at the home position which becomes the waiting position of the recording head, and protecting the discharge port preferably on completion of mounting of the recording head.

FIG. 2A, as an example based on the above thought, mounts a recording head from behind the carriage. Similarly as in FIG. 1, 101 is the recording head and 102 is the carriage. Here, 103 is a discharge restoration device equipped with a cap for protecting the discharge port of the recording head and preventing ink fixing. The constitution is such that, by performing mounting of the recording head by inserting the recording head 101 from behind the carriage 102 in the direction of the arrowhead, the recording head 101 is capped at the fixed position, and the connecting terminals 101*a* and 102*a* are correctly connected. However, according to such method, the connecting terminals will be respectively rubbed during mounting successively. Particularly, the electrode pad 111 of the connecting terminal of the recording head located on the discharging port side will be rubbed with all the electrode pads of the carriage 102. Therefore, a part of all of the terminals will be considerably damaged, whereby it has been found that electrical signals cannot be transmitted to cause defective discharging.

Accordingly, the present inventors have further thought of a method of mounting by rotation of the recording head 101 as shown in FIG. 2B, but with such constitution, mounting must be done with the discharge port surface 101*b* which becomes the front surface of the recording head 101, particularly the upper part of 101*b*, being positioned greatly forward before the constant position after mounting. Then, a great space is required in front of the carriage. However, when good ink discharging is considered, since the interval between the recording head and the recording paper is designed to be 3.0 mm or less, and therefore it has been found to be difficult to take such constitution. Also, even if mounting may be effected at the home position, because great mutual interference with the cap cannot be avoided, such inconvenience as deformation of cap, etc. has been found to occur.

SUMMARY OF THE INVENTION

The present invention has been accomplished in view of these technical tasks of the prior art and the findings by the present inventors. Shortly speaking, an object of the present invention is to provide a recording head capable of effecting electrical connection in connecting the connecting terminals without damaging terminals and which can also scrape off the protective film provided on the terminal surface by mutual rubbing of the terminals with each other, and capable of positioning surely the recording head simultaneously with mounting completion of the recording head and a member for mounting of recording head and a recording head mounting method and an ink jet recording device.

Another object of the present invention is to provide a tank integrated type recording head which can accurately position an ink tank integrated recording head as the ink jet recording head onto the carriage of an ink jet recording device, to provide a carriage which can more surely hold said recording head and to provide an ink jet recording device having a recording head which can be accurately held under the desired state relative to within the main body of the device and a carriage. Another object of the present invention is to provide a constitution which can elongate the life of the positioning portion of said head itself which is detachable and the cap within the main body.

BRIEF DESCRIPTION OF THE DRAWINGS

FIG. 1, comprising FIGS. 1A and 1B, is a schematic side view showing a prior art example of the mounting actuation of a recording head.

FIG. 2A is a schematic side view showing an example of the mounting actuation of a recording head.

FIG. 2B is a schematic side view showing an example of the mounting actuation of a recording head.

DETAILED DESCRIPTION OF THE PREFERRED EMBODIMENTS

Figure 3:
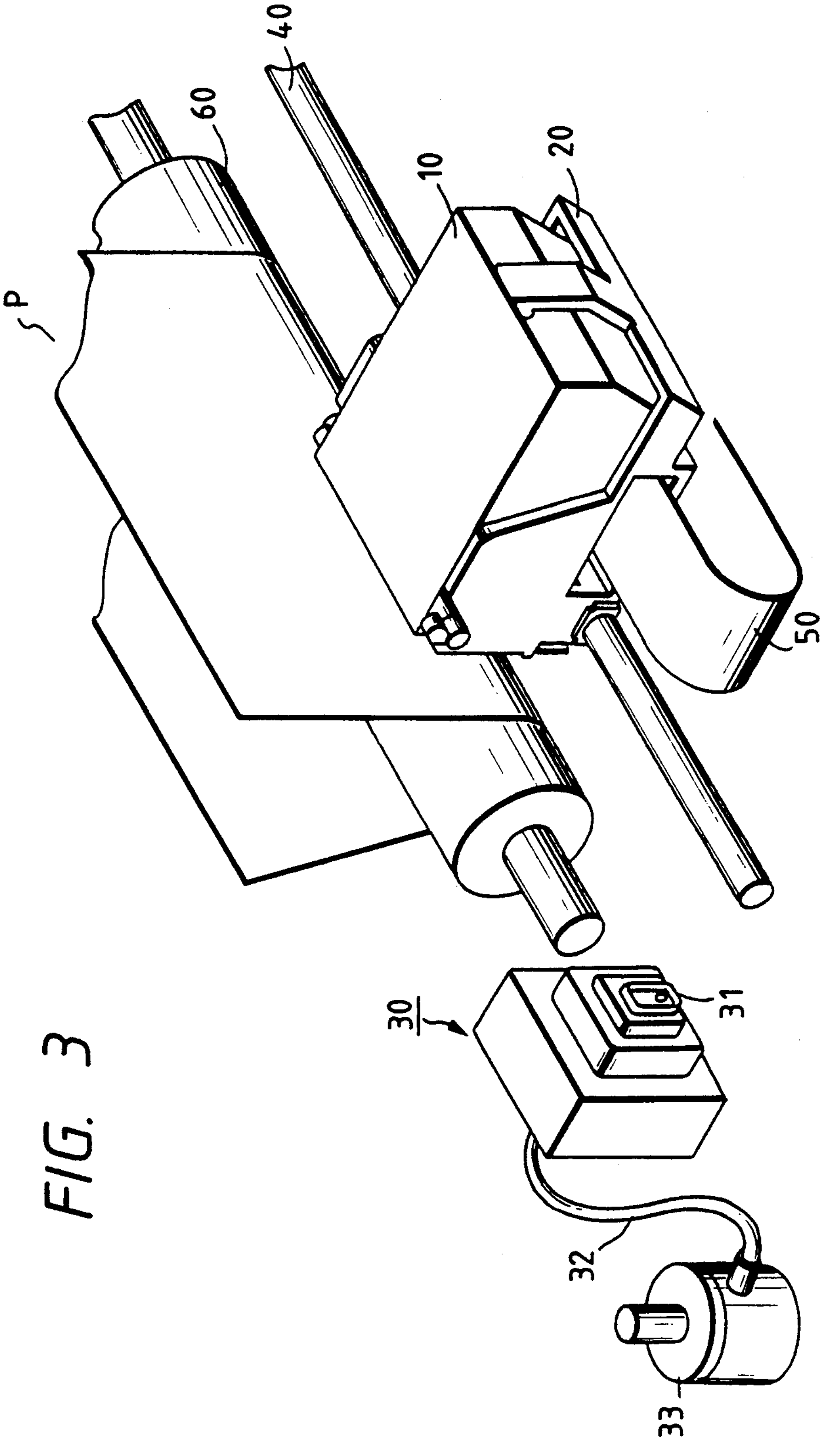
FIG. 3 is a schematic perspective view showing the ink jet recording device according to the first embodiment of the present invention.

The present invention is described below by referring to a plurality of embodiments, but the present invention is not limited by these but includes many modified embodiments, provided that the object of the present invention can be accomplished.

The present invention is a constitution which can perform positioning of the recording head and the carriage with good precision, and with such constitution, accurate positioning of the ink discharge port, and accurate positioning capable of joining pads as unit elements of electrical connecting terminals while rubbing with each other, one to one, can be done.

In the following, the respective embodiments are to be described in detail. cl First Embodiment This embodiment is an ink jet recording head having a discharge port for discharging ink and an energy generation means for generating energy for discharging ink, which is detachable relative to the mounting means for mounting the recording head onto the recording head of ink jet recording means, characterized in that the recording head has a surface having the discharge port provided thereon, an electrical connecting terminal provided on a surface forming a specific angle with respect to the surface and a rotation center portion in attachment and detachment relative to the mounting means of the recording head, the center axis of the rotation center portion is substantially parallel to the surface where the discharge port is provided and the surface where the connecting terminal is provided, with its position being made on the side opposed to the connecting terminal with respect to the surface where the discharge port is provided and outside the range where the discharge port is provided, and on the discharge port side relative to the connecting terminal near the surface side where the discharge port is provided.

Also, this embodiment is an ink jet recording device, comprising an ink jet recording head having a discharge port for discharging ink and energy generation means for generating energy for discharging ink, wherein the recording head has a surface having the discharge port provided thereon, an electrical connecting terminal provided on a surface forming a specific angle with respect to the surface and a rotation center portion in attachment and detachment relative to the mounting means of the recording head, the center axis of the rotation center portion is substantially parallel to the surface where the discharge port is provided and the surface where the connecting terminal is provided, with its position being made on the side opposed to the connecting terminal with respect to the surface where the discharge port is provided and outside the range where the discharge port is provided, and on the discharge port side relative to the connecting terminal near the surface side where the discharge port is provided and a mounting means having a site to be engaged to the rotation center for mounting the recording head.

Further, this embodiment is a method for mounting a recording head having a discharge port for discharging ink, an energy generation means for generating the energy for discharge of the ink through the discharge port and an electrical connecting terminal provided on a surface forming a specific angle with respect to the surface where the discharge port is provided, characterized in that the recording head is mounted by engaging the rotation center portion having a center axis in parallel to both the surface where the discharge port is provided and the surface where the connecting terminal is provided and located on the side opposed to the connecting terminal with respect to the surface where the discharge port is provided, outside of the range where the discharge port is provided and on the discharge port side relative to the connecting terminal near the surface side where the discharge port is provided, to the site corresponding to the mounting means with the rotation center portion as the center.

Referring now to FIGS. 3 through FIG. 8B, this embodiment is described specifically and in detail.

Figure 4:
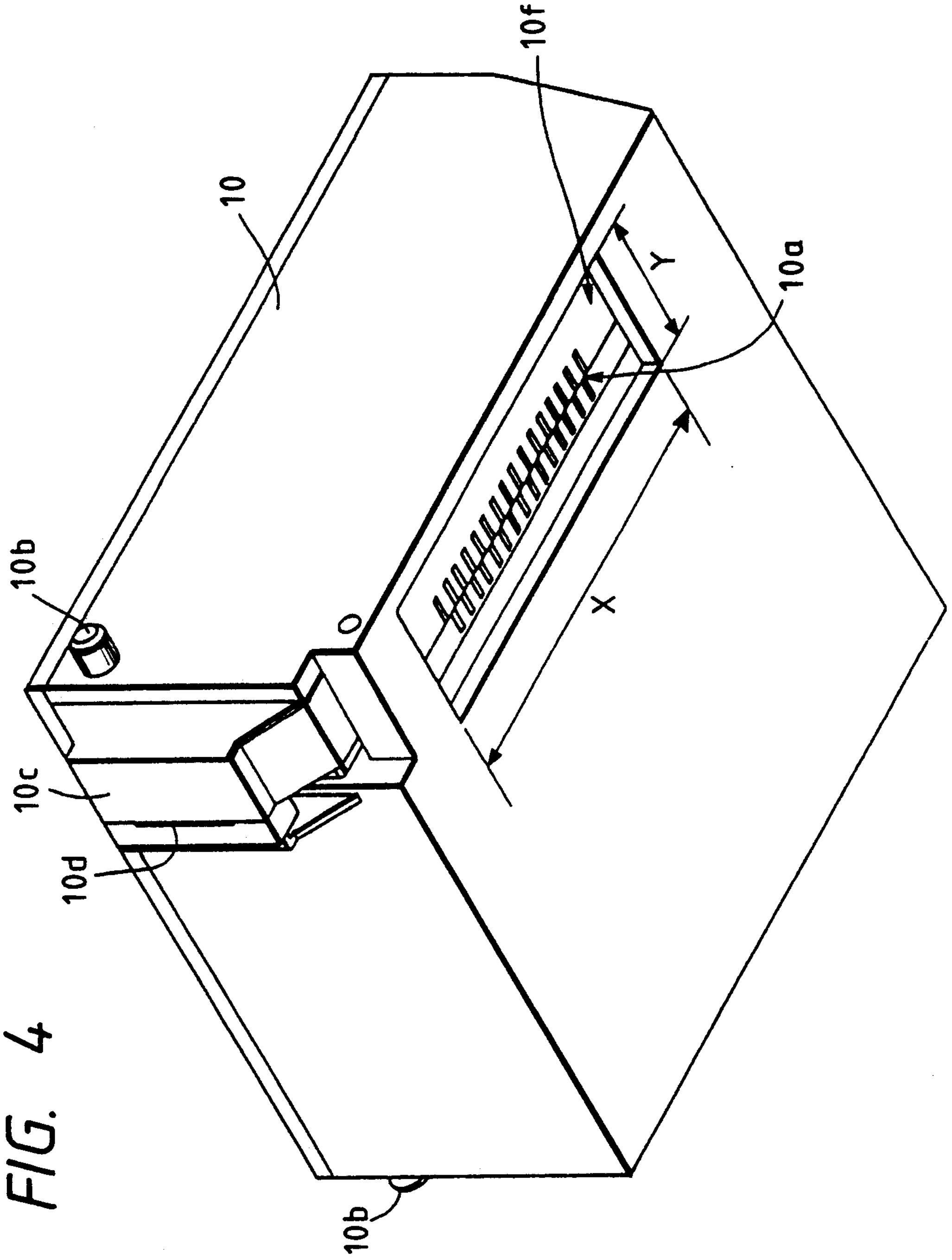
FIG. 4 is a schematic perspective view showing the constitution of the recording head according to the first embodiment of the present invention.
Figure 5A:
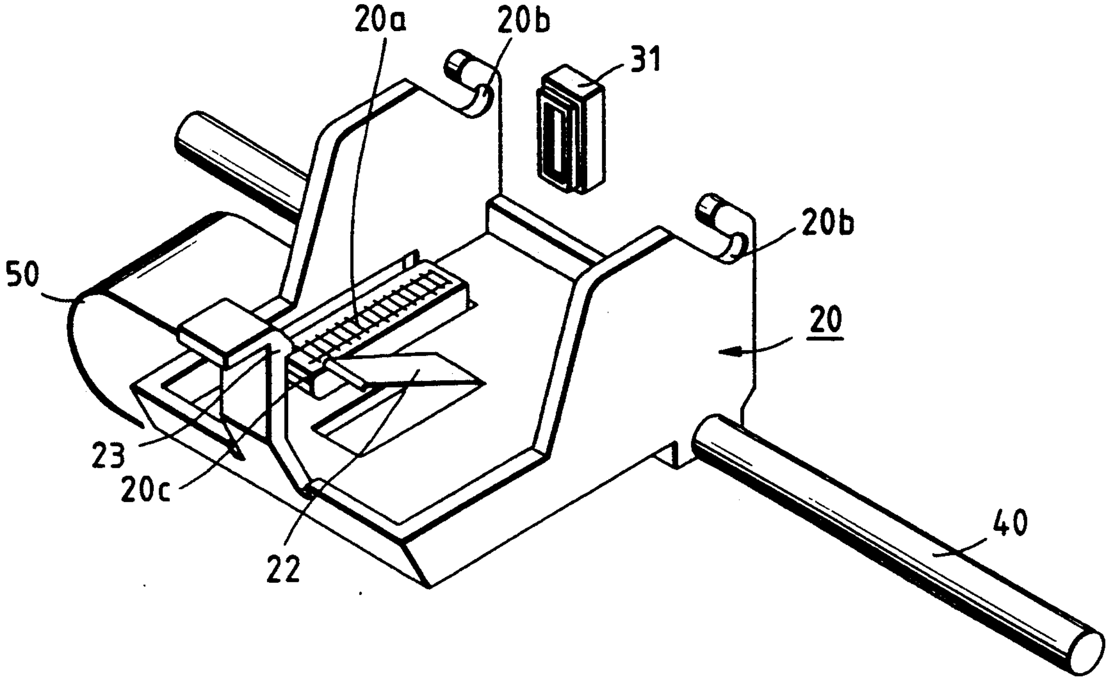
FIGS. 5A and 5B are a schematic perspective view and a top view showing the constitution of the carriage according to the first embodiment of the present invention.
Figure 5B:
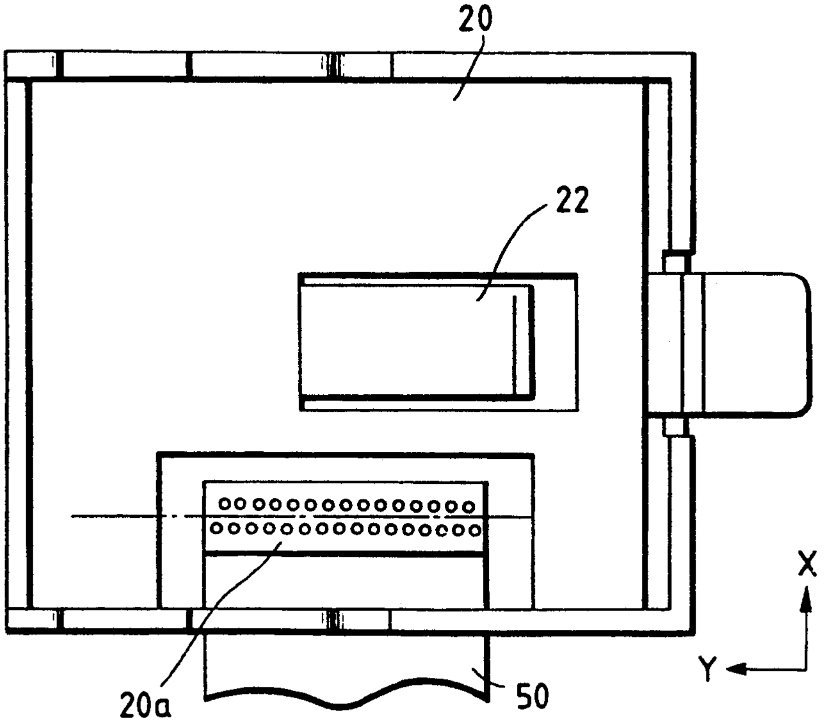

FIG. 3 is a schematic perspective view of the principal part of the recording device. FIG. 4 is a schematic perspective view of the recording head according to the embodiment of the present invention as viewed from the bottom side, and FIG. 5A is a schematic perspective view according to this embodiment, and FIG. 5B is a schematic plan view of the carriage of this embodiment as viewed from above.

First, in FIG. 3 the carriage 20 as the mounting means having the recording head 10 mounted thereon moves along the paper delivery roller 60 as guided by the guide shaft 40. The constitution is made such that the recording head 10 discharges ink toward the surface of the recording paper P as the recording medium, and forms an image with the attached ink droplets, thereby performing recording. Numeral 30 is the discharge restoration means located at the home position of the carriage 20. The discharge restoration means is constituted of a cap 31 comprising an elastic material such as rubber, etc. provided for protecting the discharge port by covering over the discharge port and also preventing fixing of ink by prevention of drying of the discharge port vicinity including the discharge port, and a suction pump 33 communicated to the cap 31 through an elastic tube 32. By sucking ink and/or air through the discharge port by reducing the pressure internally of the cap 31 with the pump 33, the discharging state of ink can be made good. The carriage 20 is located at the home position as the non-recording position except when the recording head 10 performs recording, so that the discharge port may be protected there with the cap 31. And, the constitution is made so that attachment and detachment of the recording head 10 must be performed necessarily at the home position.

This can be done by controlling electrically the motor (not shown) for driving the carriage.

Next, by referring to FIG. 4, the constitution of the recording head 10 is described. In these Figures, the recording head 10 of the ink tank integration type is equipped with a recording head element 10C provided with an electrothermal transducer not shown as the energy generation means for generating thermal energy as the energy to be utilized for discharging of ink. For such recording head element, a piezoelectric element, etc. can be alternatively employed as the energy generation means. However, the constitution by use of the electrothermal transducer as mentioned above having the advantages of simple constitution, lowered production cost and possibility of high densification may be preferably utilized.

Numeral 10*a* is a connecting terminal for transmitting the recording signal (electrical signal), 10*b* a guide pin which becomes the rotation center of the recording head 1 during attachment and detachment relative to the carriage 20 by fitting to the carriage 20 as described below. The recording head element 10*c* is provided with a plurality of ink discharge ports 10*d* on the front surface. The connecting terminal 10*a* is provided with a concavity 10*f* which is a portion recessed by about 1 to 2 mm toward inside with longitudinal length X=35 mm and lateral length Y=10 mm for preventing contamination with ink, etc. and deformation, etc. of the connecting terminal 10*a* by touching with hands during handling. Behind the recording head is provided a fixing hook 10*g* (see FIG. 6A) for fixing the recording head through engagement with the nail portion of the carriage 20.

Referring now to FIGS. 5A and 5B, the constitution of the carriage 20 is described. In these Figures, 20*a* is the connecting terminal to be connected to the connecting terminal 10*a* of the recording head 10, 20*b* the fitting portion fitted (engaged) to the guide pin 10*b* of the recording head 10, 20*c* the elastic member for giving an adequate pressure contact force (20 to 50 g per one terminal) during connection of the connecting terminals 10*a* and 20*a*, for which chloroprene rubber, urethane rubber, moltprene rubber, etc. may be used as preferable material for having optimum modulus of elasticity. Numeral 22 is a plate spring provided to taking balance with the pressure forces of connecting terminals 10*a* and 20*a*, and has the pop-up function during dismantling of the head as described below. Nail portion 23 is to be engaged with the fixing hook 10*g* of the recording head 10 to fix and hold the recording head 10 and 50 is a flexible cable for transmitting electrical signals from the recording control section not shown to the connecting terminal 20*a* of the carriage.

Here, although the description of the connecting terminal 20*a* is different between FIGS. 5A and 5B, this is done for simplification of the drawings, and the specific constitutions should be understood from the following description.

The mounting method of the recording head in the constitution as described above is described in detail by referring to FIGS. 6A to 6D.

Figure 6A:
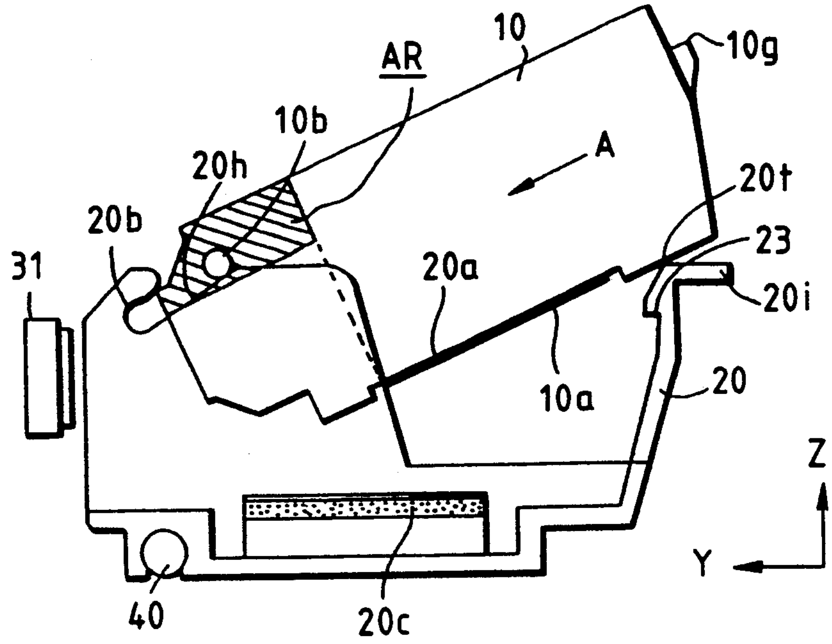
FIGS. 6A to 6D are schematic illustrations showing the mounting actuation of the recording head according to the first embodiment of the present invention.
Figure 6B:
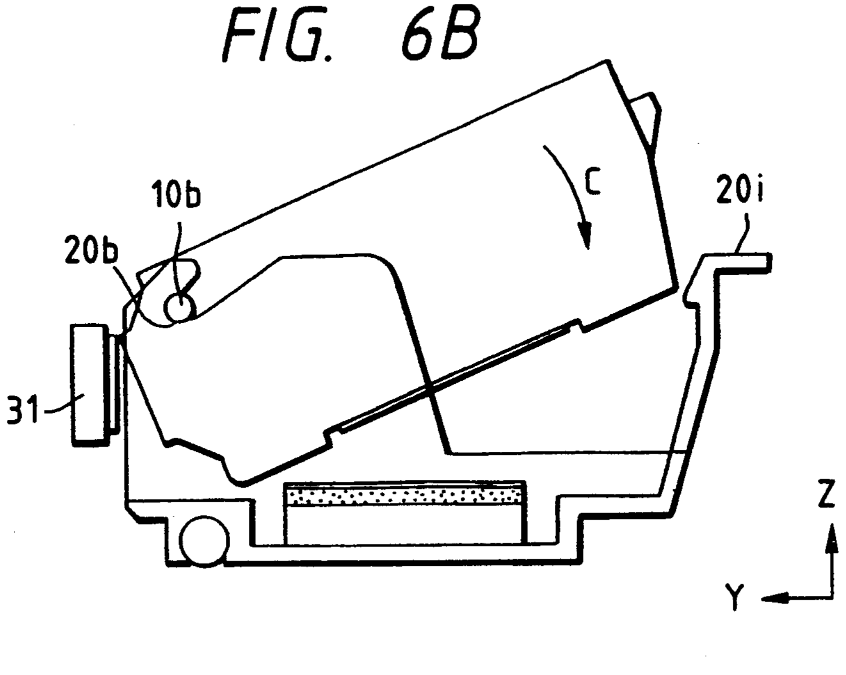
Figure 6C:
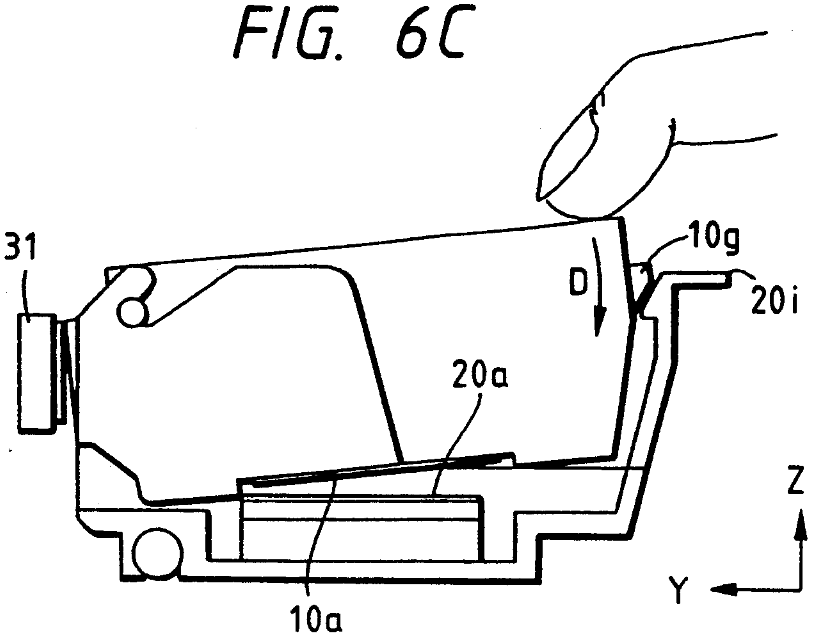
Figure 6D:
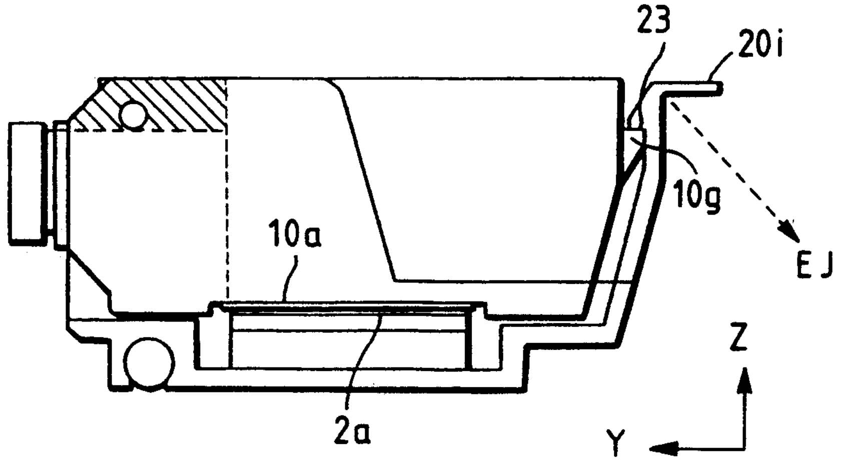

FIG. 6A shows the state of mounting initiation state, FIG. 6B the first state in the course of mounting, FIG. 6C the second state in the course of mounting and the FIG. 6D the state on completion of mounting.

First, as shown in FIG. 6A, when the recording head 10 is placed on the carriage 20, the guide pin 10*b* of the recording head 10 and the surface 10 at the bottom of the head 10 are guided by the guide surface 20*h* and the tip end 20*t* of the lock lever 20*i*, and moves in the direction A in the Figure by the weight of the recording head 1. Next, as shown in FIG. 6B, when the guide pin 10*b* is fitted into the fitting portion 20*b*, the rear end portion of the recording head 10 comes off from the lock lever 20*i*, to rotate the guide pin 10*b* in the direction C with the guide pin 10*b* as the center, whereby the fixing hook 10*g* comes against the lock lever as shown in FIG. 6C. Next, when the rear end of the recording head 10 is compulsorily pushed down in direction D, the discharge port surface from the state as shown in FIG. 6C contacts little by little from its upper portion the elastic portion of the cap 31. Then, the connecting terminals 10*a* and 20*a* contact successively from the discharge outlet side, until finally the fixing hook 10*g* is hooked by the nail portion 23 of the lock lever 20*i* to become the state held by fixing as shown in FIG. 6D, whereby the connecting terminals 10*a* and 20*a* are correctly connected electrically and mechanically.

In the constitution capable of performing the actuation as described above, since the guide pin 10*b*, namely the rotation center of the recording head 10 is provided within the range AR upwardly of the position corresponding to the cap and in front of the connecting terminal, the front surface (namely discharge port) and the cap 31 of the recording head element 10*c*, and the connecting terminals 10*a* and 20*a* are adequately contacted or connected with each other without interference with other portions.

Further, by slight rubbing mutually between the connecting terminals during mounting of the recording head 10, foreign matters existing on the terminal surface can be also shaven off or scraped off to give the action of effecting sure electrical connection.

Figure 7A:
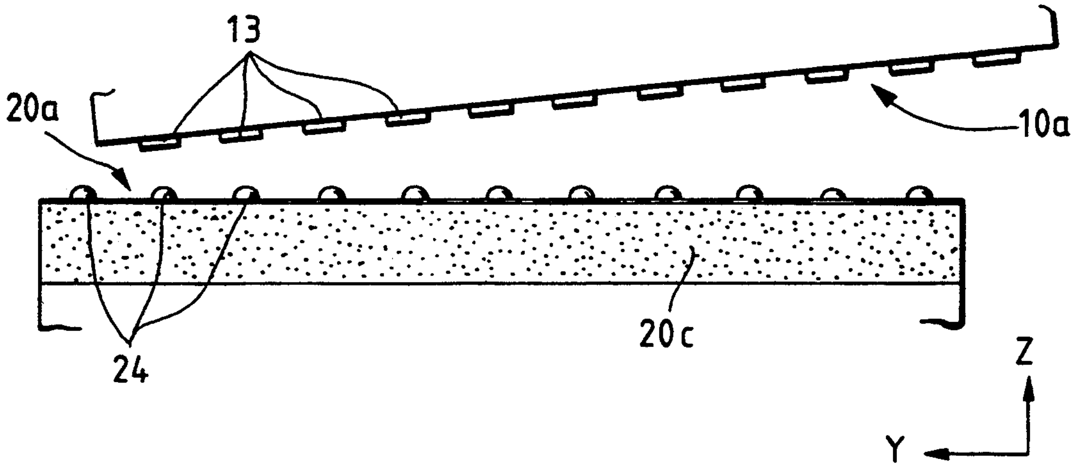
FIGS. 7A to 7E are schematic illustrations showing the manner of connection of the recording head and the connecting terminals of the carriage according to the first embodiment of the present invention.
Figure 7B:
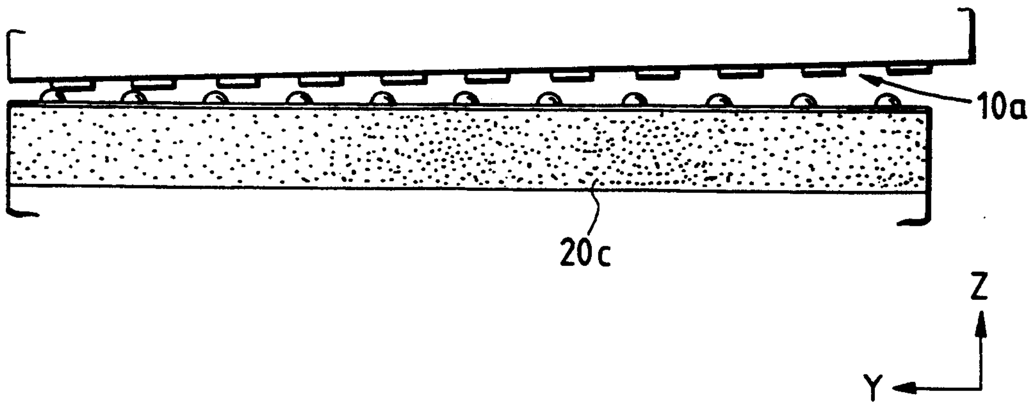
Figure 7C:
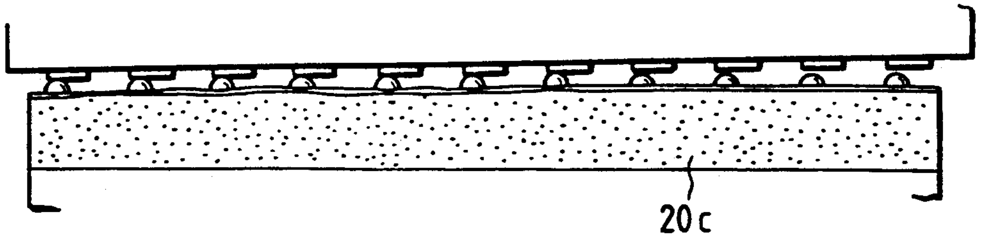
Figure 7D:
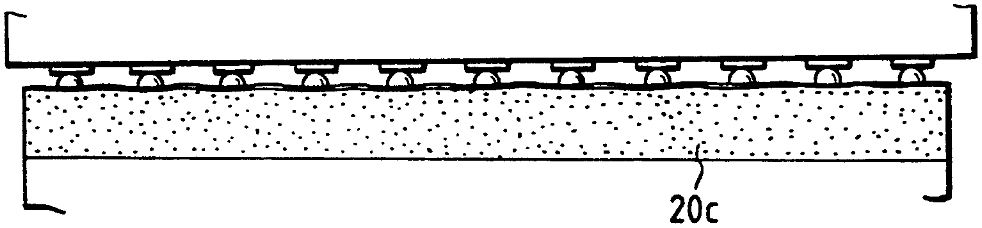
Figure 7E:
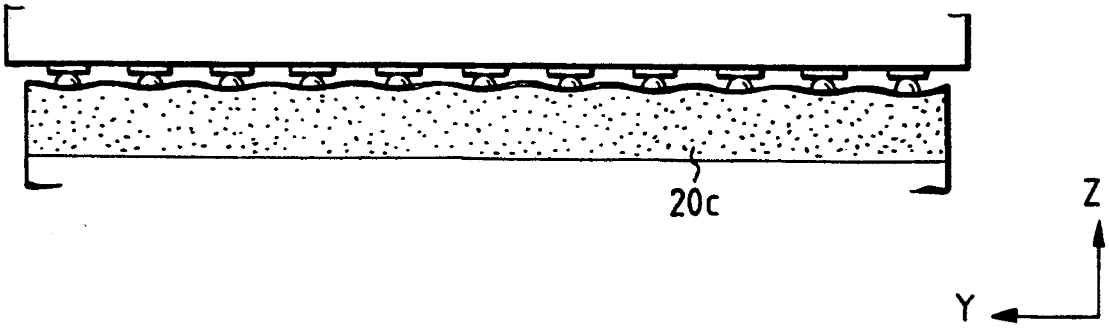
Figure 8A:
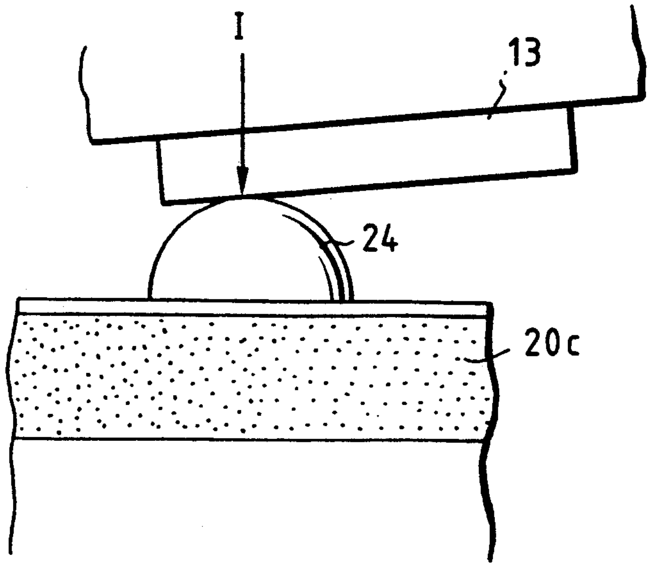
FIGS. 8A and 8B are schematic partially enlarged views showing the manner of connection of the connecting pads in FIGS. 5A to 5E.
Figure 8B:
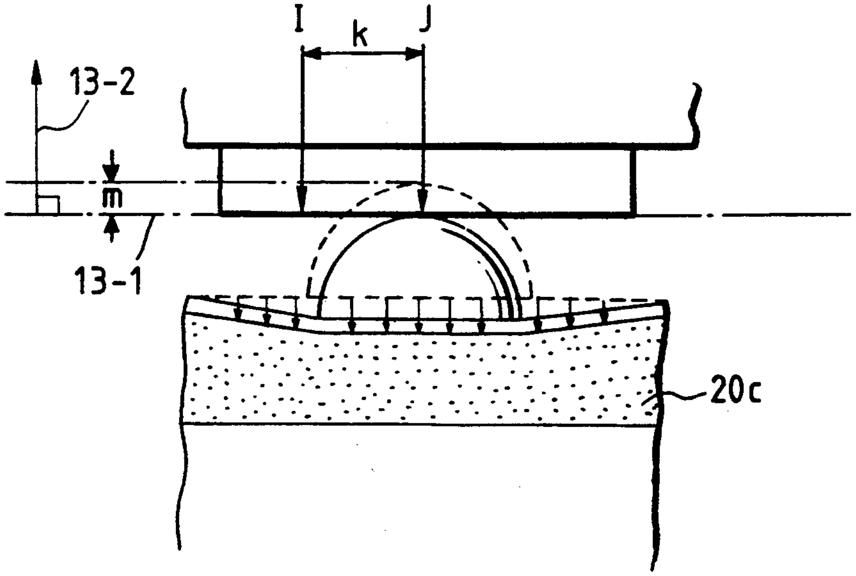

This manner is described in more detail by referring to FIGS. 7A to 7E and FIGS. 8A and 8B. FIGS. 7A through 7E show the manner in which the connecting terminals are bonded or connected to each other. FIGS. 8A and 8B are schematic illustrations partially enlarged of one of a plurality of electrode pads of connecting terminal, showing the states at the beginning of contact and on completion of connection.

The plural number of electrode pads 13 of the connecting terminal 10*a* of the recording head 10 of this embodiment are made of lead frame of metal, etc., with the contact points being made flat. The plural number of electrode pads 24 of the connecting terminal 20*a* of the carriage 20 are worked into semispherical projected shapes by application of plating to the terminal on the flexible cable 50. Corresponding to the mounting actuation of the recording head, the electrode pads from the discharge port side will contact from the state in FIG. 7A as shown in FIG. 7B, and successively as shown in FIG. 7C. In transferring from FIGS. 7B to 7E, the pads are rubbed mutually one to one to maintain good electrical contact.

The pressure contact force at the contact point of the pad is controlled through deformation of the elastic member 20*c*, whereby superfluous contact force can be absorbed to give adequate pressure contact force. When mounting of the recording head is completed, as shown in FIG. 7E, the position of the connecting terminal 20*a* of the carriage is positioned lower than the position in FIG. 5A, whereby the pressure contact force is applied upwardly with the elastic member 20*c*. Such pressure contact force is balanced with the forces of the nail 23 and the fitting portion 20*b* of the carriage. Further, connection of the terminal is described in detail by referring to FIGS. 8A and 8B. In FIGS. 8A and 8B, I shows the contact position of the electrode pad 12 at the beginning of contact, and J the contact position of the electrode pads 13, 24 under the final state. Through the slippage k between the contact points, even when foreign matters may be adhered on the contact point terminal surface, they can be scraped off to effect sure electrical connection. For connection as describe above ($k>0$) to be effected, the constitution is required to be made such that the rotation center as the standard for rotation should be positioned with a predetermined distance in the direction of the normal line 13-2 of the contact portion of the electrode pad 13 of the recording head from the tangential line 13-1 of the contact portion, and also the electrical pad 24 of the carriage 20 should be dislocated ($m>0$) when the head 10 is mounted.

Next, the method for dismantling the recording head 10 is to be described.

First, when the lock lever 20*i* is moved by pressing in the direction EJ in FIG. 6D as described above, the fixing hook 10*g* is disengaged from the nail 23 to release fixing of the recording head. Then, by the plate spring 22 provided for taking balance with the connecting terminals 10*a* and 20*a*, the rear portion of the recording head is hopped up through elastic force, and can be readily taken out.

Further, in the above-described embodiment of the present invention, the ink discharge port 10*d*, the electrical connecting terminal 10*a* are all provided on substantially one straight line in the recording head element 10*c* so as to hold readily the positional relationships of the respective elements with high precision. Also, in the present embodiment, further the above elements are provided on one end side where the recording head is located, and further the cap is located on the above straight line in the home position. According to this constitution, the positioning member for carriage and electrical connecting terminals can be arranged on one side of the recording head and the carriage, whereby an extremely advantageous constitution in aspect of practical armoring such as withdrawing of flexible cable, etc. is given, and also unsure capping due to positional slippage can be prevented to make the probability of breaking of the recording head and the cap accompanied with mounting actuation of the recording head much lower.

As described above, according to the mounting method of the first embodiment of the present invention, there is no breaking by way of rubbing of connecting terminals than is necessary and the recording head will receive no bad influence from outside, and also, even if foreign matters may be attached on the terminal surface of the recording head, they can be removed to effect mounting of the recording head onto the correct position of the carriage with a force enough to obtain electrical connection.

Also, attachment and detachment of the recording can be surely done while performing positioning with high precision.

Second embodiment

Next, the second embodiment according to the present invention is to be described.

Many points of the constitution of this embodiment are the same as in the first embodiment as described above. The different point is that a positioning means for performing positioning with still better precision is provided.

More specifically, this embodiment is an ink jet recording head having a discharge port for discharging ink and an energy generation means for generating energy for discharging ink, which is detachable relative to the mounting means for mounting the recording head onto the recording head of an ink jet recording means, characterized in that the recording head has a surface having the discharge port provided thereon, an electrical connecting terminal provided on a surface forming a specific angle with respect to the surface and a rotation center portion in attachment and detachment relative to the mounting means of the recording head, the center axis of the rotation center portion is substantially parallel to the surface where the discharge port is provided and the surface where the connecting terminal is provided, with its position being made on the side opposed to the connecting terminal with respect to the surface where the discharge port is provided and outside the range where the discharge port is provided, and on the discharge port side relative to the connecting terminal near the surface side where the discharge port is provided, and further has a positioning member provided between the discharge port and the connecting terminal.

Further, it is an ink jet recording device, comprising an ink jet recording head having a discharge port for discharging ink and an energy generation means for generating energy for discharging ink, wherein the recording head has a surface having the discharge port provided thereon, an electrical connecting terminal provided on a surface forming a specific angle with respect to the surface and a rotation center portion in attachment and detachment relative to the mounting means of the recording head, the center axis of the rotation center portion is substantially parallel to the surface where the discharge port is provided and the surface where the connecting terminal is provided, with its position being made on the side opposed to the connecting terminal with respect to the surface where the discharge port is provided and outside the range where the discharge port is provided, and on the discharge port side relative to the connecting terminal near the surface side where the discharge port is provided, further having a positioning means provided between the discharge port and the connecting terminal, and a mounting means having a member engaged with the positioning member for mounting the recording head.

Referring now to the drawings of FIGS. 9 through 14B, one embodiment of the present invention is to be described specifically and in detail.

Figure 9:
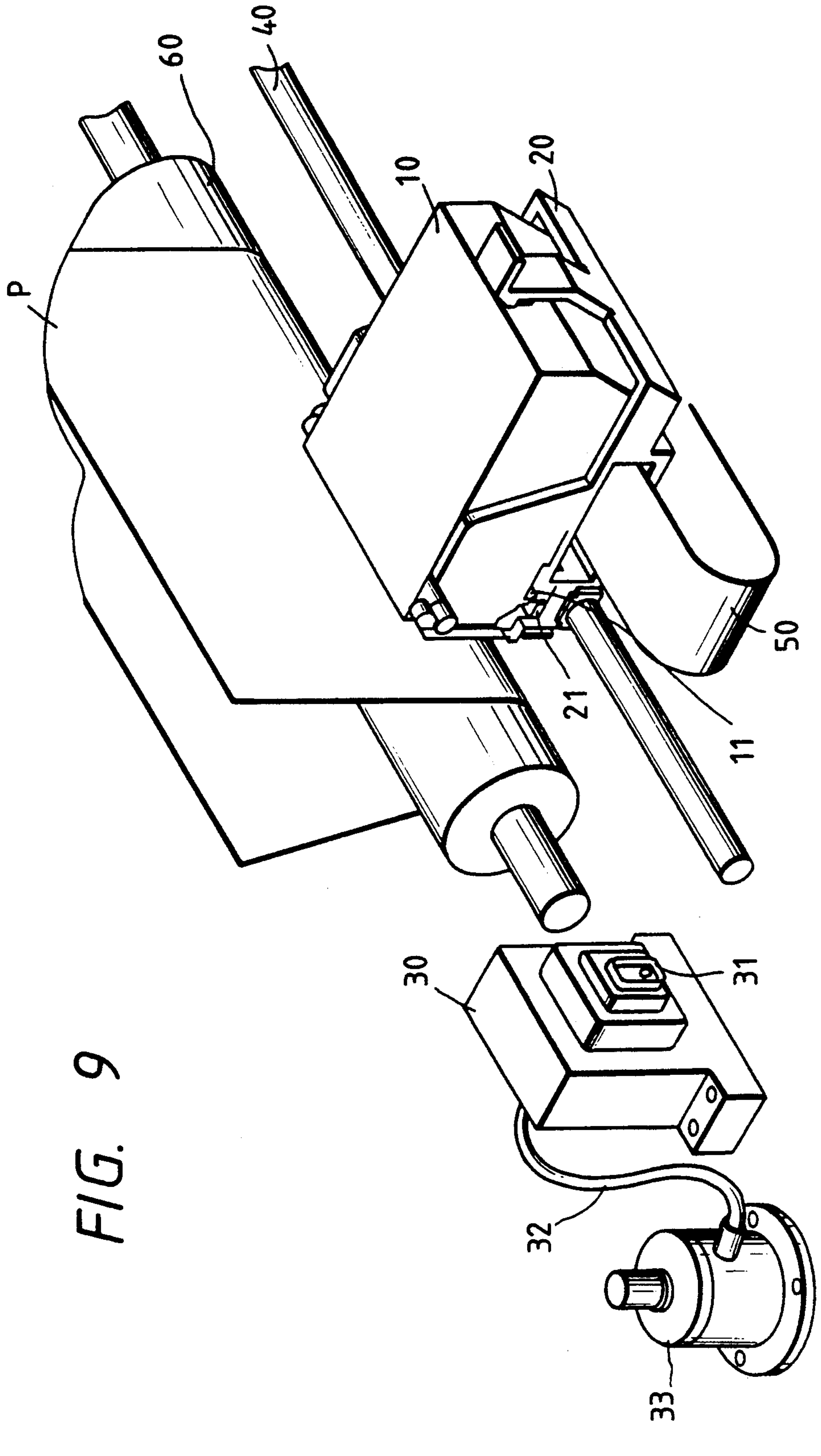
FIG. 9 is a schematic perspective view showing the ink jet recording device according to the second embodiment of the present invention.
Figure 10A:
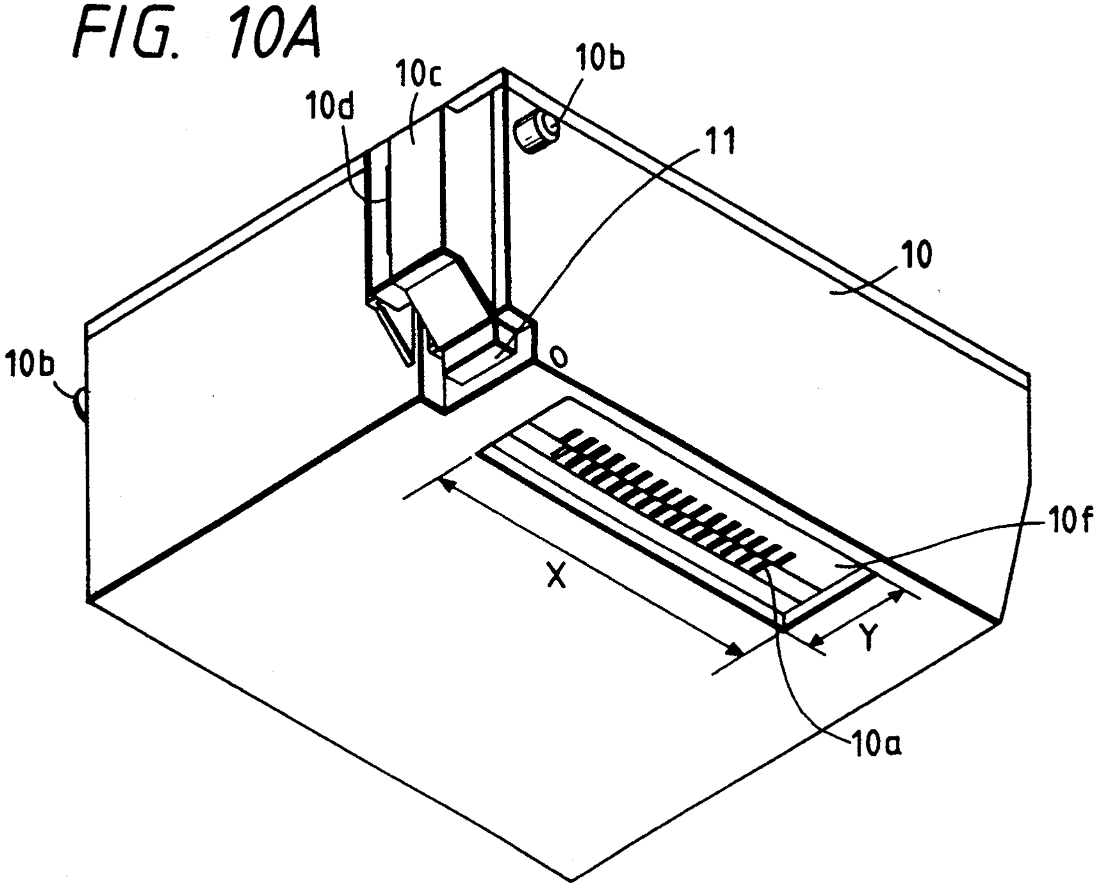
FIGS. 10A and 10B are a schematic perspective view and a sectional view showing the constitution of the recording head according, to the second embodiment of the present invention.

FIG. 9 is a schematic perspective view of appearance showing the principal part of the recording device. FIG. 10A is a schematic perspective view of the recording head of this embodiment of the present invention as viewed from the bottom side, FIG. 10B is a schematic plan view of the recording head according to this embodiment, FIG. 11A is a schematic perspective view of the carriage according to this embodiment, and FIG. 11B is a schematic plan view of this embodiments as viewed from above.

First, in FIG. 9, the carriage 20 as the mounting means having the recording head 10 mounted thereon moves along the paper delivery roller 60 as guided by the guide shaft 40. Recording head 10 discharges ink toward the surface of the recording paper P as the recording medium, thereby forming an image with the attached ink droplets to effect recording. Numeral 30 is the discharge restoration means located at the home position of the carriage 20. The discharge restoration means is constituted of a cap 31 comprising an elastic material such as rubber, etc. provided for protecting the discharge port by covering over the discharge port and also preventing ink from depositing by prevention of drying of the discharge port vicinity including the discharge port, and a suction pump 33 communicated to the cap 31 through an elastic tube 32. By sucking ink and/or air through the discharge port by reducing the internal pressure of the cap 31 with the pump 33, the discharging state of ink can be made good. The carriage 20 is located at the home position as the non-recording position except when the recording head 10 performs recording, so that the discharge port may be protected there with the cap 31. And, the constitution is made so that attachment and detachment of the recording head 10 must be performed necessarily at the home position. The above-mentioned constitution is the same as in the first embodiment.

Figure 10B:
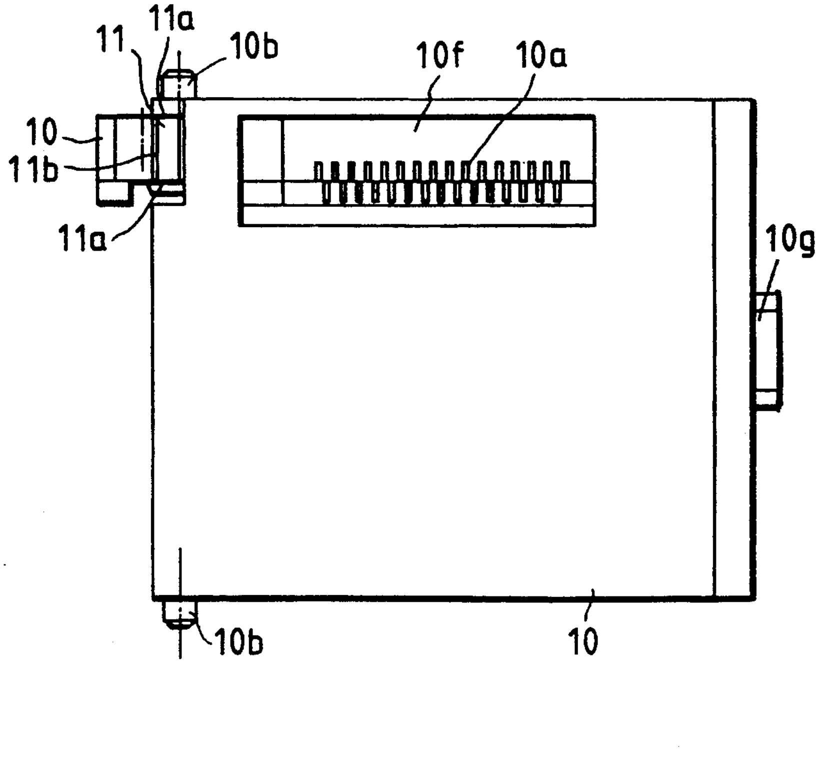
Figure 11A:
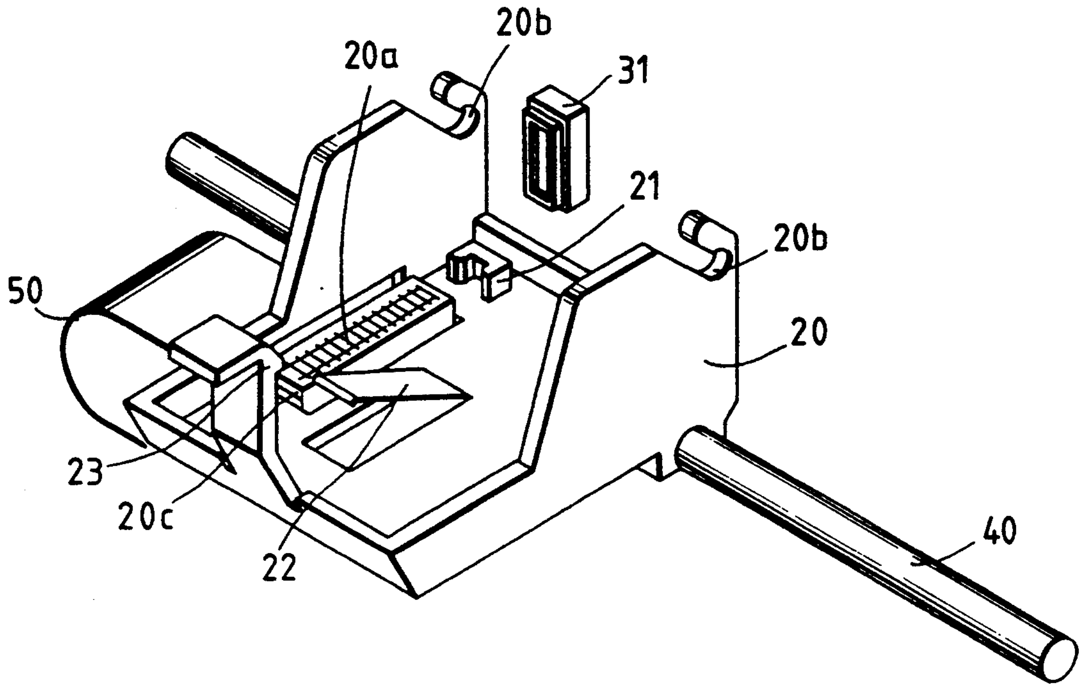
FIGS. 11A and 11B are a schematic perspective view and a top view showing the constitution of the second embodiment of the present invention.
Figure 11B:
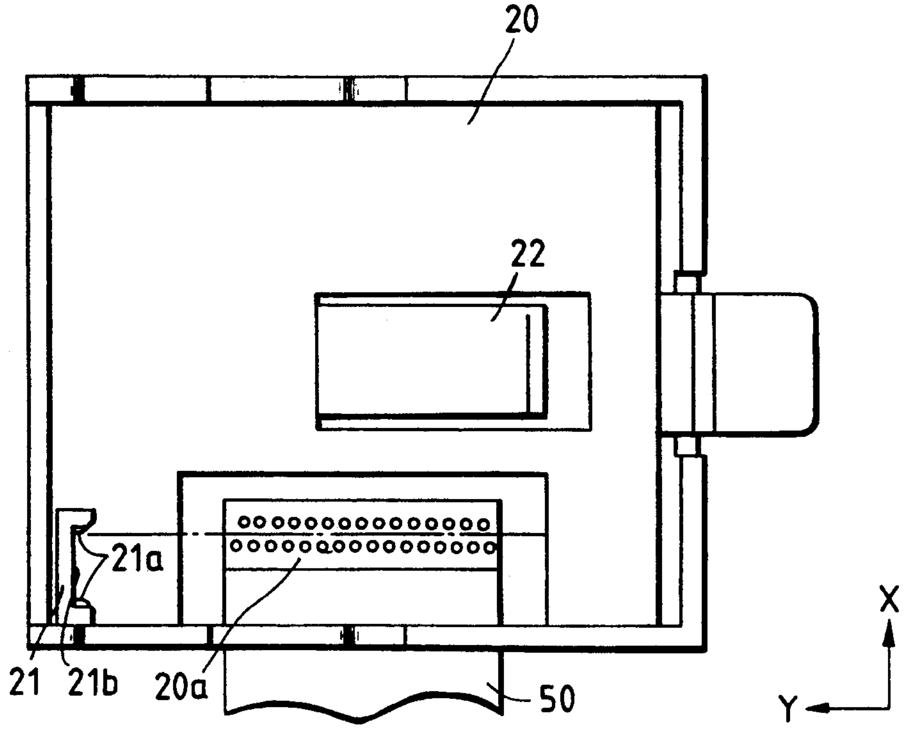

Next, by referring to FIGS. 10A and 10B, the constitution of the recording head 10 is described. In these Figures, the recording head 10 of the ink tank integration type is equipped with a recording head element 10*c* provided with an electrothermal transducer not shown as the energy generation means for generating thermal energy as the energy to be utilized for discharging of ink. As the energy generation means to be employed for such recording head element, a piezoelectric element, etc. can be alternatively employed. However, the constitution by use of the electrothermal transducer as mentioned above having the advantages of simple constitution, lowered production cost and possibility of high densification may be preferably utilized.

Numeral 10*a* is a connecting terminal for transmitting the recording signal (electrical signal), 10*b* a guide pin which becomes the rotation center of the recording head 1 during attachment and detachment relative to the carriage by fitting to the carriage 20 as described below. The recording head element 10*c* is provided with a plurality of ink discharge ports 10*d* on the front surface. The connecting terminal 10*a* is provided with a concavity 10*f* which is a portion recessed by about 1 to 2 mm toward inside with longitudinal length X=35 mm and lateral length Y=10 mm for preventing contamination with ink, etc. and deformation, etc. of the connecting terminal 10*a* by touching with hands during handling. Behind the recording head is provided a fixing hook 10*g* (see FIG. 6A) for fixing the recording head through engagement with the nail portion of the carriage 20. And as the characteristic point of this embodiment, a rib 11 as the positioning member is provided on substantially the straight line connecting the ink discharge port 10*d* and the connecting terminal 10*b*. The rib 11 performs positioning through engagement of the positioning member of the carriage 20 as described later.

Referring now to FIGS. 11A and 11B, the constitution of the carriage 20 is described. In these Figures, 20*a* is the connecting terminal bonded to the connecting terminal 10*a* on the carriage side of the recording head 10, 20*b* the fitting portion fitted to the guide pin 10*b* of the recording head 10, 20*c* the connecting terminal 10*a*, 20*a* the elastic member for giving an terminal) during bonding or connecting of the terminal 10*a*, for which chloroprene rubber, urethane rubber, moltprene rubber, etc. may be used as preferable material for having optimum modulus of elasticity. Numeral 21 is a positioning member formed at the concavity for effecting positioning through engagement with the positioning rib 11 of the recording head 10. The positioning member on the inserted side is tapered as shown in FIG. 11B, 22 is a plate spring provided to take balance with the pressure forces of connecting terminals 10*a*, 20*a*, and has the hop-up function during dismantling of the head as described below. Nail 23 is to be engaged with the fixing hook 10*g* of the recording head 10 to fix and hold the recording head 10 and 50 is a flexible cable for transmitting electrical signals from the recording control section not shown to the connecting terminal 20*a* of the carriage.

The mounting method of the recording head in the constitution as described above is described in detail by referring to FIGS. 12A, 12B, 12C and 12D.

Figure 12A:
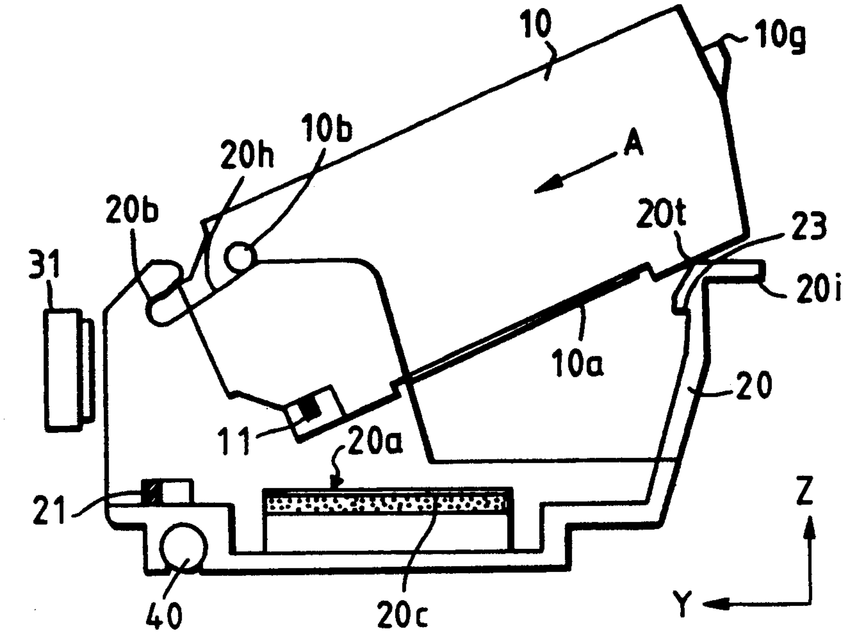
FIGS. 12A to 12D are schematic illustrations showing the mounting actuation of the recording head according to the second embodiment of the present invention.
Figure 12B:
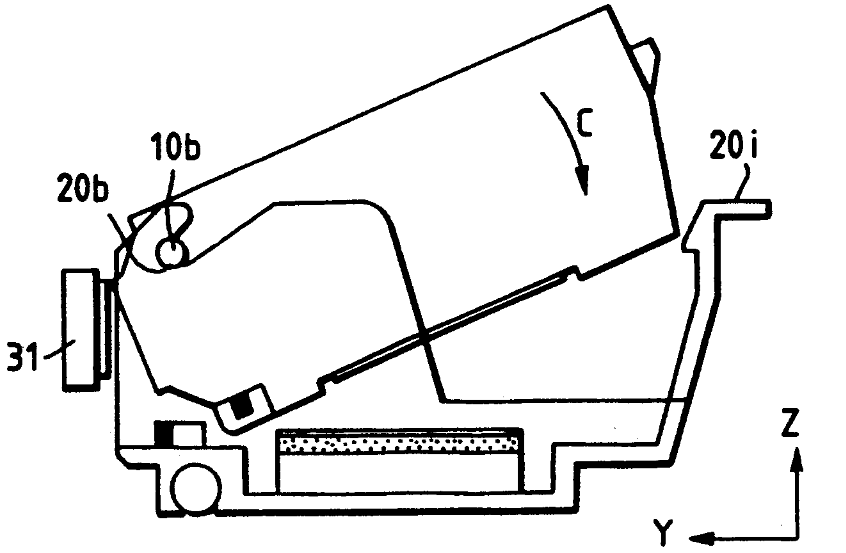
Figure 12C:
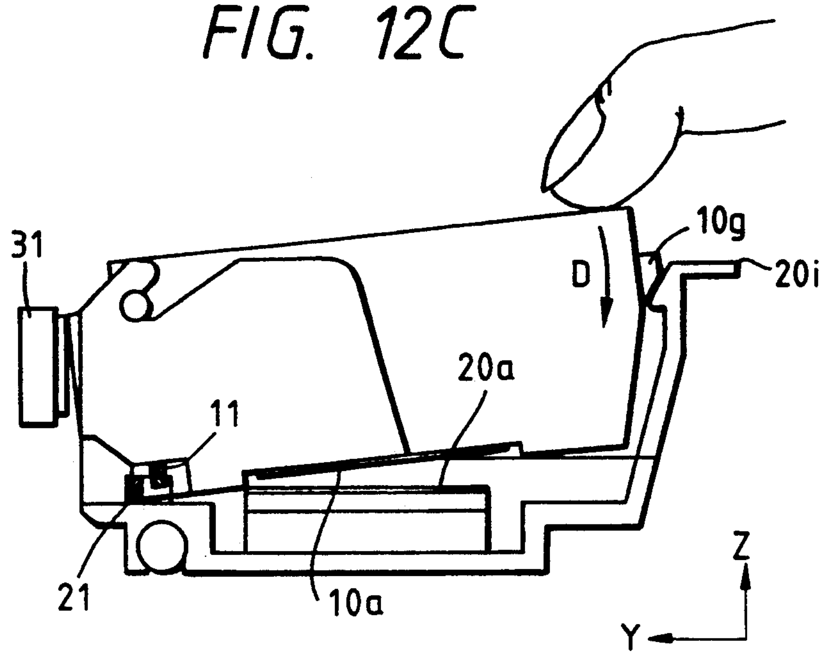
Figure 12D:
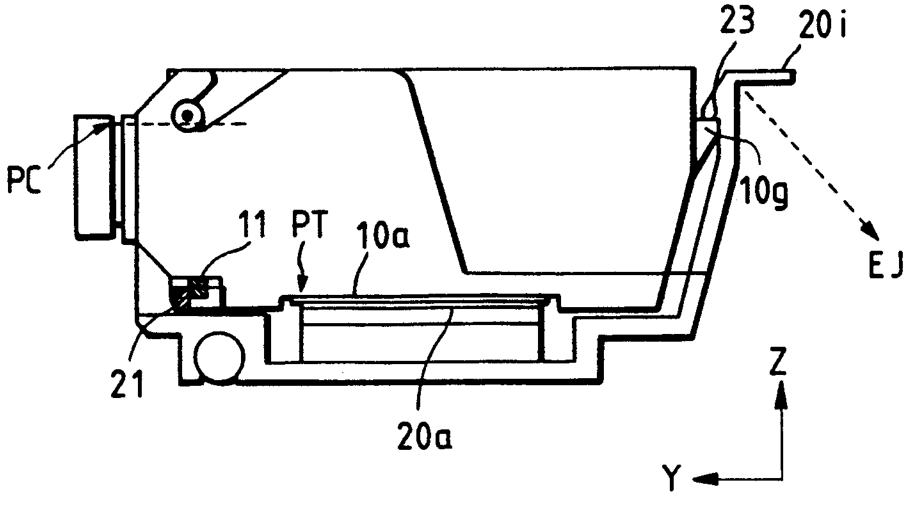

FIG. 12A shows the state of mounting initiation state, FIG. 12B the first state in the course of mounting, FIG. 12C the second state in the course of mounting and the FIG. 12D the state on completion of mounting.

First, as shown in FIG. 12A, when the recording head 10 is placed on the carriage 20, the guide pin 10*b* of the recording head and the surface at the bottom of the recording head are guided by the guide surface 20*h* and the tip end 20*t* of the lock lever 20*i*, and moves readily in the direction A in the Figure by the weight of the recording head 1. Next, as shown in FIG. 12B, when the guide pin 10*b* is fitted into the fitting portion 20*b*, the rear end portion of the recording head 10 comes off from the lock lever 20*i*, to rotate the guide pin 10*b* in the direction C with the guide pin 10*b* as the center, whereby the fixing hook 10*g* comes against the lock lever as shown in FIG. 12C. At this time, for positioning of the recording head 10, the side face 11*a* of the rib 11 (FIG. 10B) begins to be fitted into the inside face 21*a* (FIG. 11B) of the positioning member 21 of the carriage 20 to effect positioning in the direction x in FIG. 11B.

Next, when the rear end of the recording head 10 is compulsorily pushed down in the direction D in FIG. 12C, the discharge port surface from the state as shown in FIG. 12C retracts little by little from its upper portion the elastic portion of the cap 31. Then, the connecting terminals contact successively from the discharge port side, then the pads of connecting terminals 10*a*, 20*a* successively from the discharge port side, until finally the fixing hook 10*g* is hooked by the nail portion 23 of the lock lever 20*i* to become the state held by fixing as shown in FIG. 12D, whereby the connecting terminals 10*a* and 20*a* are correctly connected electrically and mechanically. At this time, the discharge port is also surely capped. At this time, the front surface 11*b* of the positioning rib 11 of the recording head 10 and the inner rear surface 21*b* of the positioning member 21 of the carriage 20 come against each other, whereby the positioning in the direction y in FIG. 11B is effected (see FIGS. 10B, 11B).

In the constitution capable of performing the actuation as described above, since the guide pin 10*b*, namely the rotation center of the recording head 10, is provided within the range PC in FIG. 12D upwardly of the position corresponding to the cap and in front of the position PT of the connecting terminal, the front surface (namely discharge port) and the cap 31 of the recording head element 10*c*, and the connecting terminals 10*a* and 20*a* are adequately contacted or connected with each other without interference with other portions.

Further, by slight rubbing mutually between the connecting terminals during mounting of the recording head 10, foreign matters existing on the terminal surface can be also shaven off or scraped off to give the action of effecting sure electrical connection.

Figure 13A:
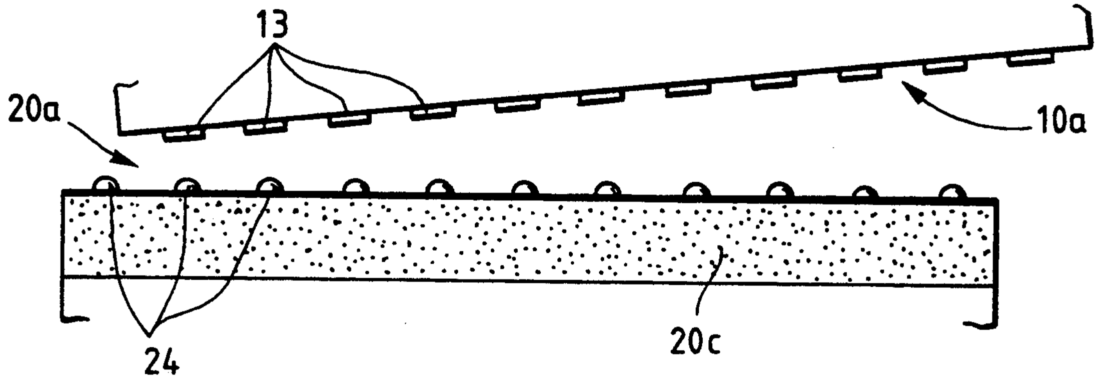
FIGS. 13A to 13E are schematic illustrations showing the manner of the connecting terminal according to the present invention.
Figure 13B:
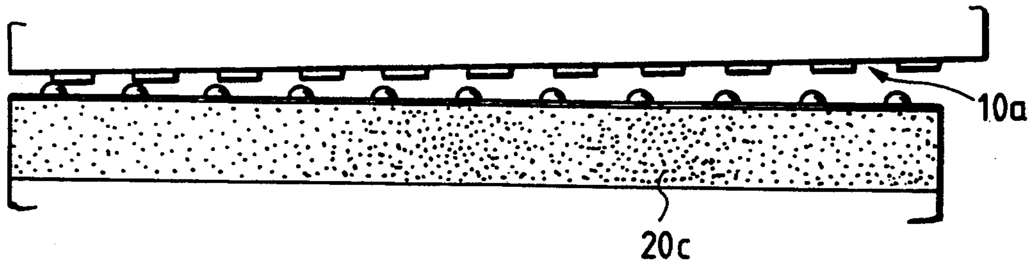
Figure 13C:
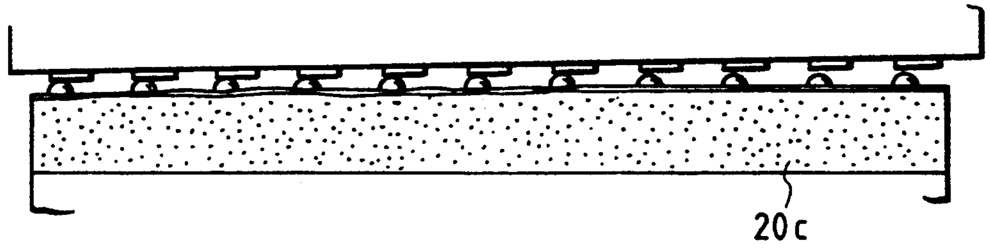
Figure 13D:
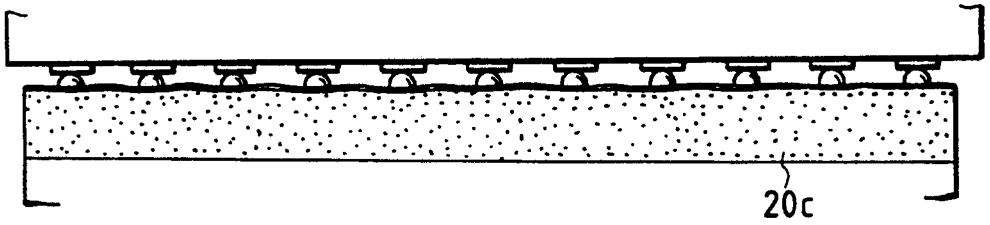
Figure 13E:
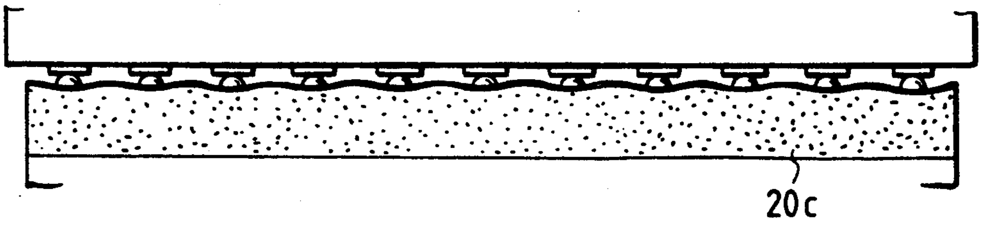
Figure 14A:
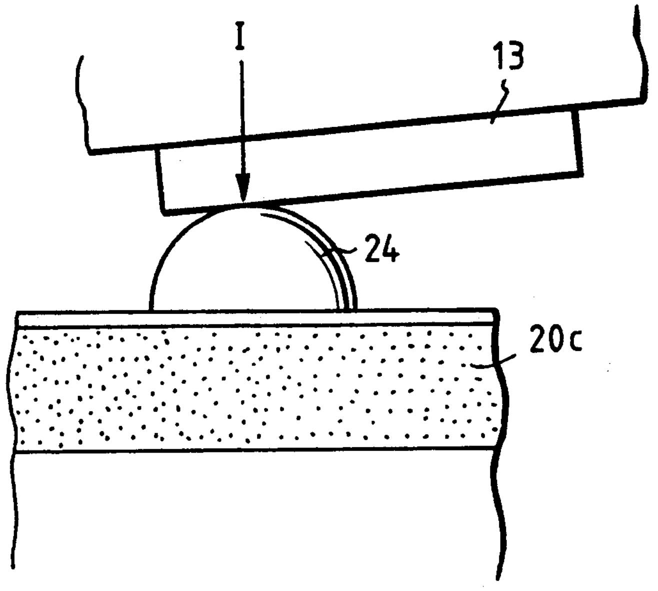
FIGS. 14A and 14B are schematic partially enlarged views showing the manner of connection of the connecting pads in FIGS. 13A to 13E.
Figure 14B:
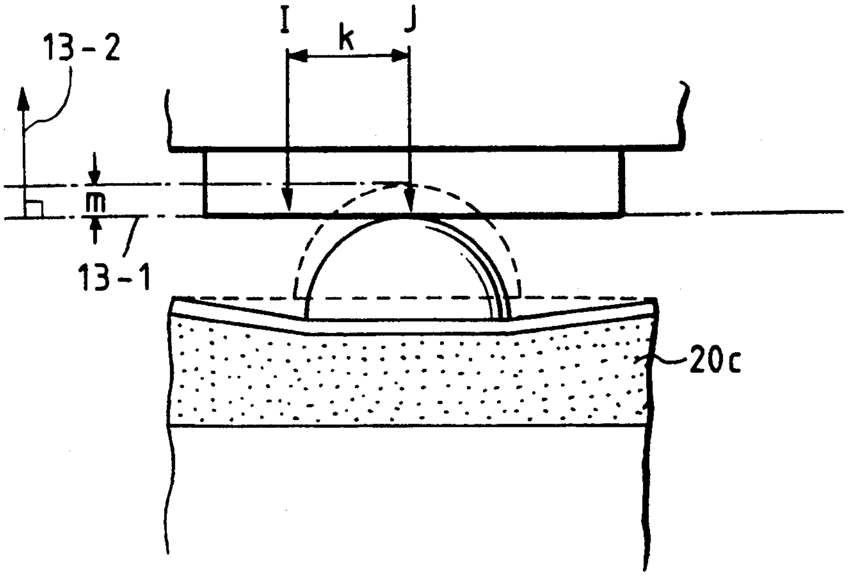

This manner is described in more detail by referring to FIGS. 13A to 13E, 14A and 14B. FIG. 13A through 13E show the manner in which the connecting terminals are bonded to each other. FIGS. 14A and 14B are schematic illustrations partially enlarged of one of a plurality of electrode pads as unit elements of connecting terminal, showing the states at the beginning of contact and on completion of connection.

The plural number of electrode pads 13 of the connecting terminal 10*a* of the recording head 10 of this embodiment are made of lead frame of metal, etc., with the contact points being made flat. The plural number of electrode pads 24 of the connecting terminal 20*a* of the carriage 20 are worked into semispherical projected shapes by application of plating to the terminal on the flexible cable 50. Corresponding to the mounting actuation of the recording head, first the electrode pads from the discharge port side will contact from the state in FIG. 13A as shown in FIG. 13B, and successively as shown in FIG. 13C. In transferring from FIGS. 13B to 13E, the pads are rubbed mutually one to one to maintain good electrical contact.

The pressure contact force at the contact point of the pad is controlled through deformation of the elastic member 20*c*, whereby superfluous contact force can be absorbed to give adequate pressure contact force. When mounting of the recording head is completed, as shown in FIG. 13E, the position of the connecting terminal 20*a* of the carriage is positioned lower than the position in FIG. 13A, whereby the pressure contact force is applied upwardly with the elastic member 20*c*. Such pressure contact force is balanced with the forces of the nail 23 and the fitting portion 20*b* of the carriage. Further, connection of the terminal is described in detail by referring to FIGS. 14A and 14B. In FIGS. 14A and 14B, I shows the contact position of the electrode pad 12 at the beginning of contact, and J the contact position of the electrode pads 13, 24 under the final state. Through the slippage k between the contact points, even when foreign matters may be adhered on the contact point terminal surface, they can be scraped off to effect sure electrical connection. For connection as described above ($k>0$) to be effected, the constitution is required to be made such that the rotation center as the standard for rotation should be positioned with a predetermined distance in the direction of the normal line 13-2 of the contact portion of the electrode pad 13 of the recording head from the tangential line 13-1 of the contact portion, and also the electrical pad 24 of the carriage 20 should be dislocated ($m>0$) when the head 10 is mounted.

Next, the method for dismantling the recording head 10 is to be described.

First, when the lock lever 20*i* is moved by pressing in the direction EJ in FIG. 12D, the fixing hook 10*g* is disengaged from the nail 23 to release fixing of the recording head 10. Then, by the plate spring 22 provided for taking balance with the connecting terminals 10*a*, 20*a*, the rear portion of the recording head is hopped up through elastic force, and can be readily taken out.

Further, in the above-described embodiment of the present invention, and the ink discharge port 10*d*, if the positioning rib 11, the electrical connecting terminal 10*f* are all provided so as to be overlapped with at least a part of the respective elements on substantially one straight line in the recording head element 10*c*, the positional relationships of the three elements can be held with high precision. Further, in the present embodiment, the above three elements are provided on one end side where the recording head is located, and further the cap is located on the above straight line in the home position. According to this constitution, the positioning member for carriage and electrical connecting terminals can be arranged on one side of the recording head and the carriage, whereby an extremely advantageous constitution in aspect of practical armoring such as withdrawing of flexible cable, etc. is given, and also unsure capping due to positional slippage can be prevented to make the probability of breaking of the recording head and the cap accompanied with mounting actuation of the recording head much lower.

As described above, according to the mounting method of the first embodiment of the present invention, there is no breaking by way of rubbing of connecting terminals than is necessary and the recording head will receive no bad influence from outside, and the recording head can be positioned to the correct position of the carriage.

Further, the ink discharge port of the head, the positioning member and the electrical connecting member can be arranged in this order on a substantially straight line, whereby attachment and detachment of the recording head can be done simply and surely, while positioning the ink discharge port and the electrical connecting terminal relative to the carriage with high precision.

Thus, by one actuation of mounting of the recording head, at least the three operations of positioning of head, electrical connection, and capping can be completed.

Also, in the above second embodiment, the cap, the positioning rib and the connecting terminal are on a substantially straight line. That is, they are not completely coincident on one straight line, but a part of the respective elements are deviated from the straight line, but of course they can be made coincident with each other.

Third embodiment

In the first and the second embodiments as described above in detail, description has been made about the mounting actuation accompanying the rotational actuation from the upper direction to the lower direction as the direction (yz) crossing the moving direction of the carriage.

In this third embodiment, in addition to the rotational actuation in the direction (yz) as mentioned above, rotational actuation within the plane (xy) in parallel to the moving direction of the carriage. And, as the joining actuation of the connecting terminal, as different from the above first and second embodiments, rotation within a plane in parallel to the moving direction of the carriage is utilized.

Such actuations would be readily understood by addition of geometrical considerations.

Thus, still more protection of the connecting terminal can be effected, and also protection of the positioning member can be strengthened.

Also, in this third embodiment, as different from the first and the second embodiments, since two rotational actuations are accompanied, no rotation center as shown in the first and the second embodiments is provided. However, it is a constitution for accomplishing the object of the present invention, and can invariably exhibit the effect for that purpose and is of course included within the category of the present invention.

In the following embodiments, the first constitution of the present invention is that, in an ink tank integrated type recording head detachable relative to an ink jet recording device, the head has a recording portion for ink discharging protruded forwardly from the ink tank and a positioning portion of the recording portion relative to the recording device, with the positioning portion being positioned inside of the boundary of the space formed by the boundary comprising connection mutually between the ends on the side where the recording portion is positioned and the outer surface of the recording head.

Alternatively, it is made such that in an ink tank integrated type recording head detachable relative to the ink jet recording device, the head has an ink tank, a recording portion mounted onto the ink tank, the recording portion having a base plate adhered to the ink tank and a plurality of regions for positioning of the element recording portion provided on the base plate itself, with the positioning regions being made the positioning portions of the ink tank integrated type to the main body of the recording device.

Further, it is made such that in an ink tank integrated type recording head detachable to the carriage of the ink jet recording device, the head has an electrode portion which receives driving signals from the main body of the device by electrically connecting to the power supplying portion provided on the carriage for mounting the main body, a positioning portion, which is provided around the recording portion held integrally with the recording head, for positioning the recording portion of the recording head into the carriage through engagement with the receiving portion for positioning on the carriage, and an impeding portion for impeding electrical connection of the electrode portion with the power supplying portion and also impeding engagement of the positioning portion with the receiving portion for positioning through sliding with the carriage, the above electrical connection and the above engagement being made tolerable when the impeding portion becomes a concavo-convex engagement with the carriage.

Further, it is made such that in a carriage of an ink jet recording device for mounting a detachable ink jet recording head, the carriage has a receiving portion for receiving the positioning on the recording portion side provided on the recording head, a protruded portion inserted into the concavity of the recording head and equipped with a power supplying portion to be connected electrically to the electrode portion within the concavity, a sliding portion which inhibits engagement of the positioning portion with the receiving portion for positioning and also impeding electrical connection by sliding relatively with the recording head for mounting of the recording head, an engaging receiving portion which affords engagement of the positioning portion with the receiving portion for positioning and electrical connection through concavo-convex engagement with the recording head, and a holding means for maintaining the mounting position of the recording head.

Further, it is made such that in an ink jet recording device equipped with a cap for covering over the recording portion of the head through adhesion to an ink jet recording head, the device has a carriage having a mounting position for mounting the ink jet recording head at the position opposed to the above cap, a guide portion for guiding the recording head while maintaining a gap between the cap and the recording portion, so as to prevent contact of the recording portion of the recording head with the cap, in mounting the ink jet rebording head onto the carriage in the position, a concavo-convex engaging portion to the recording head existing on the extended line from the guide portion which affords adhesion of the recording portion to the cap substantially simultaneously with mounting of the recording head on the recording head positioning region of the carriage, and a recording head holding means equipped with an elastic portion which ensures concavo-convex engagement by imparting an elastic force.

In the prior art, an exchangeable, detachable type recording head (recording head cartridge) had a positioning portion at the position which is outer surface of the cartridge, including the end, and therefore damaging or attachment of dust, etc. sometimes occurred by falling, whereby the inherent positioning portion may come out of order.

However, according to the present invention, since the positioning portion is formed within the space where the positioning portion can be positively protected, and therefore it has become possible to effect positioning correctly even if inconveniences in operation may occur to cause falling or end contamination to occur.

Also, in integration of the ink tank and the recording head, the positioning of the cartridge to the main body has been effected with the ink tank as the center, and in addition, one which also effects positioning of the recording head itself, or one having further the positioning portion of the recording head added has been considered. However, while these proved to be poor in precision, in the present invention, since also the positioning of the cartridge of the cartridge and the recording portion of the recording head is performed relative to the base plate of the recording head, positioning with high precision can be accomplished.

Further, according to the present invention, damaging of the positioning portion, the electrode portion of the cartridge during attachment and detachment can be reduced to great extent, whereby damaging of the carriage itself relative to the cartridge can be prevented to great extent. As the result, the positioning precision can be improved to great extent. Since the electrode is located within the concavity, there is the electrode protection effect, and also lowering in positioning precision with dust, etc. attached on the electrode can be prevented.

In addition, according to the present invention, the discharge function of the head can be maintained by ensuring quickly the capped state during cartridge mounting, while preventing damaging of the cap and the head.

Those corresponding to the above expressions and the constitutions as described in the embodiment of the present inventions are included in the present invention. In the concavo-convex engagement (portion) in the above-mentioned constitutions, all embodiments are included in the present invention, provided that one is convexity, the other is concavity or a combination of both. Also, the present invention is inclusive of all combinations with any desired constitution of the above technical thoughts.

Referring now to the drawings, the present embodiment is described specifically and in detail.

Figure 15:
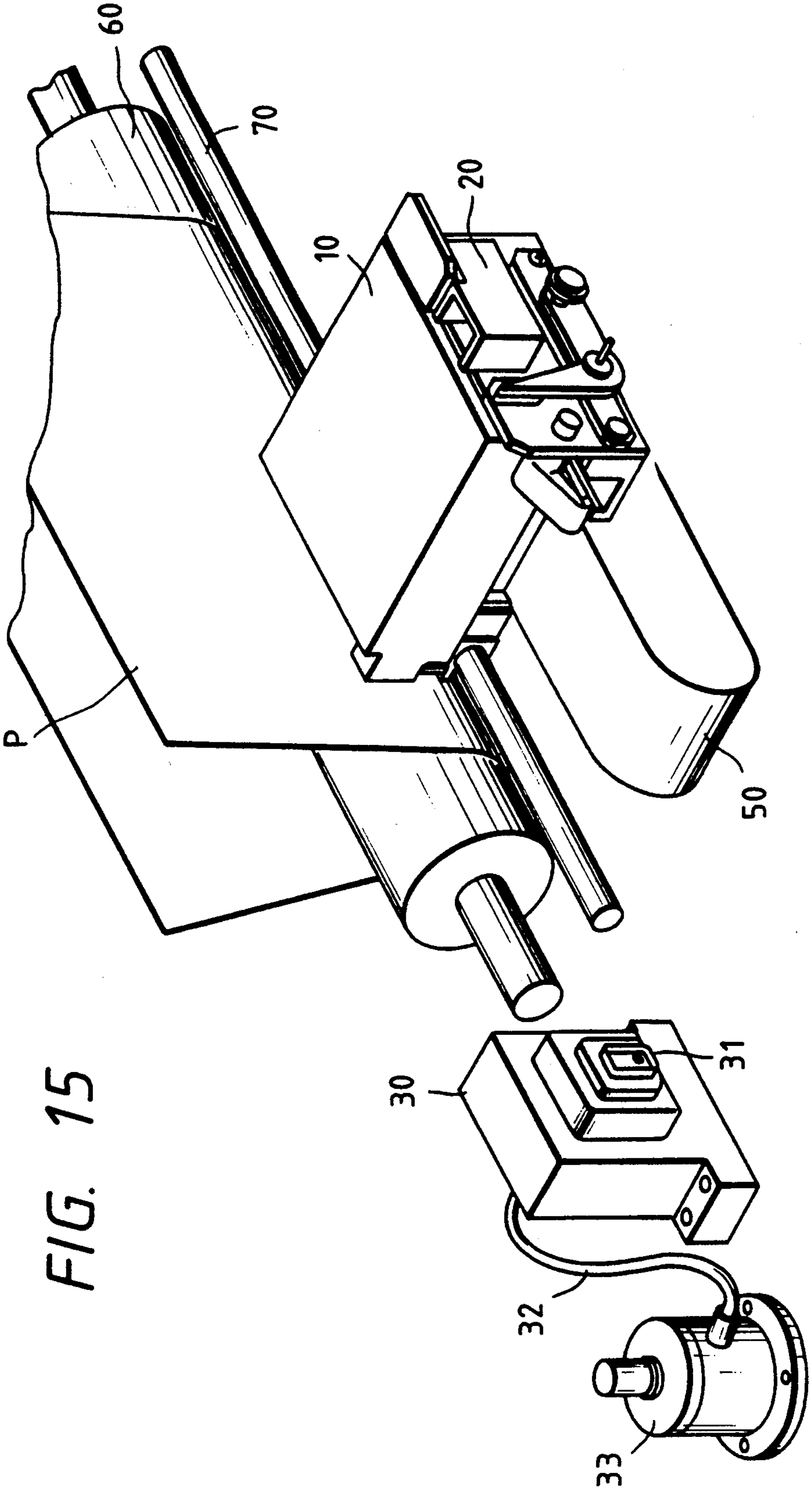
FIG. 15 is a perspective view of the ink jet recording device according to the third embodiment of the present invention.
Figure 16A:
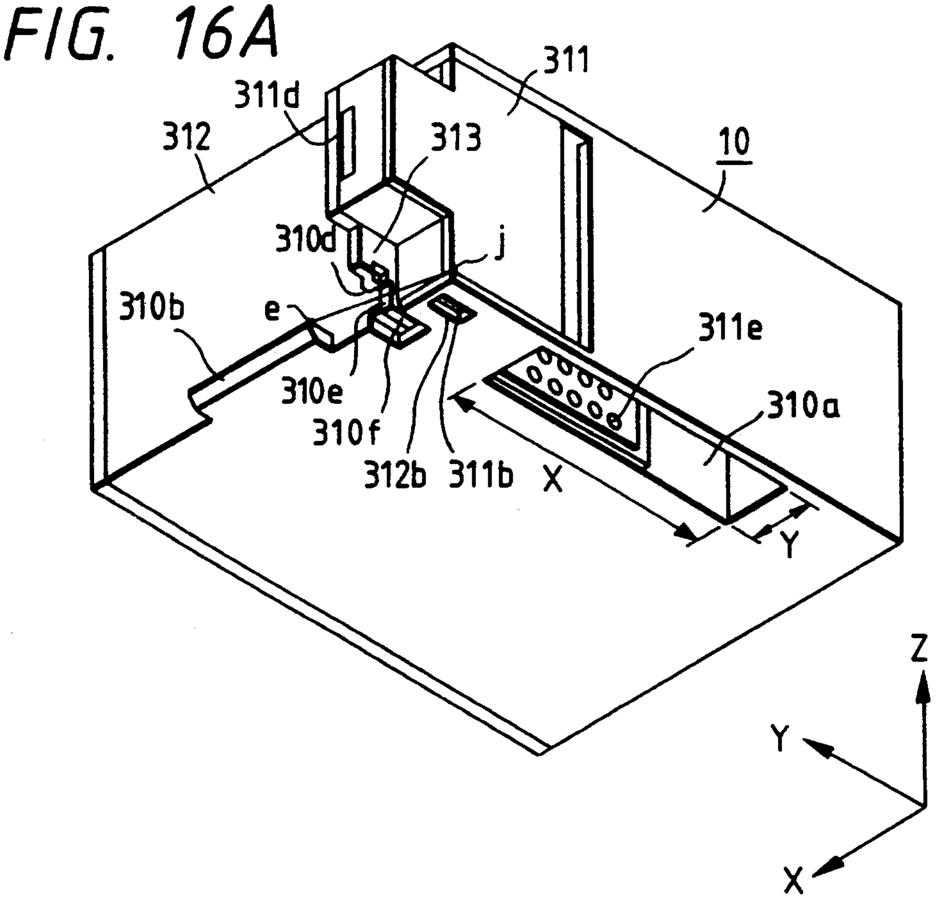
FIGS. 16A to 16C are, respectively, a perspective view of the recording head to be mounted on the printer shown in FIG. 15 as viewed from the bottom side, its perspective view as viewed from the top side, and its bottom view.
Figure 16B:
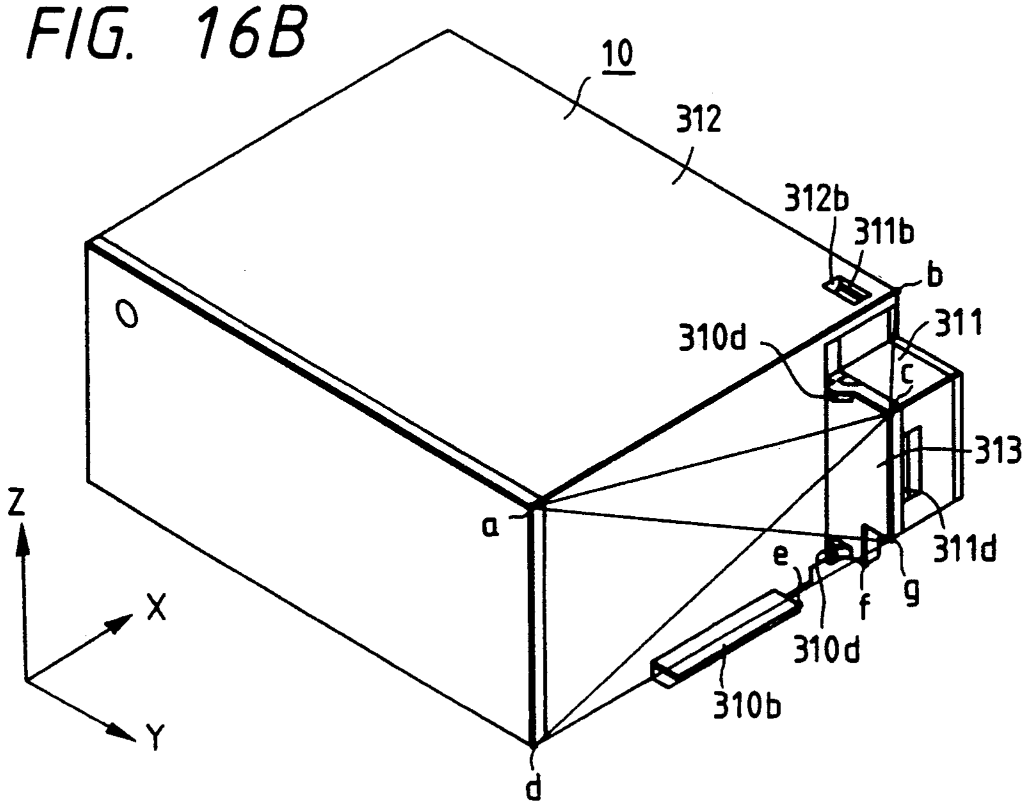
Figure 16C:
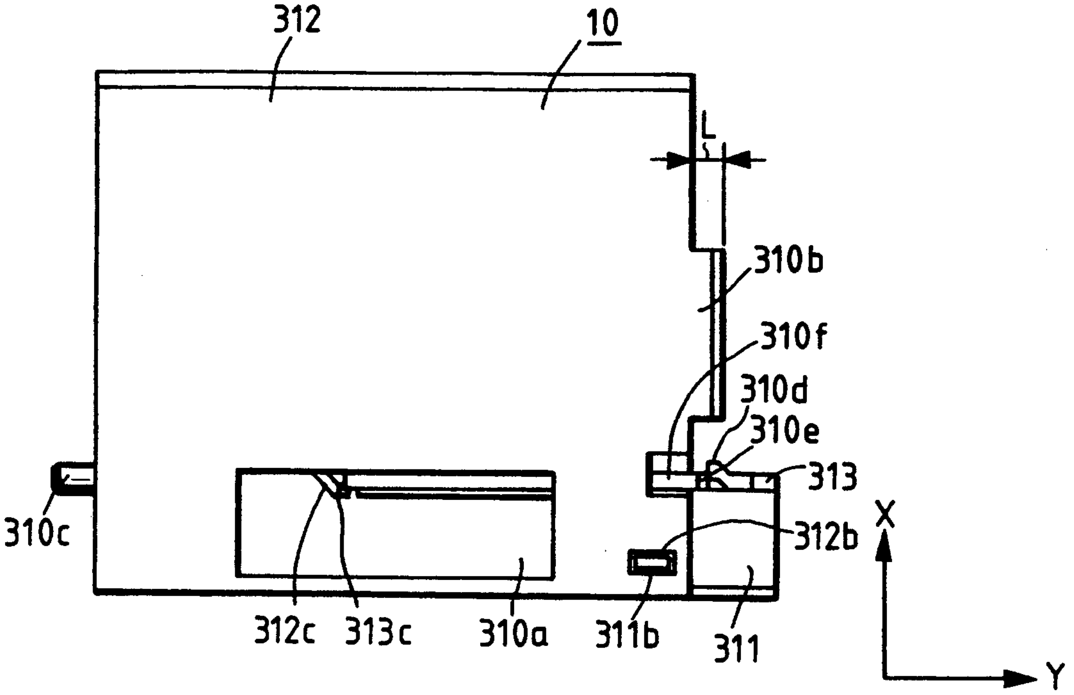
Figure 17:
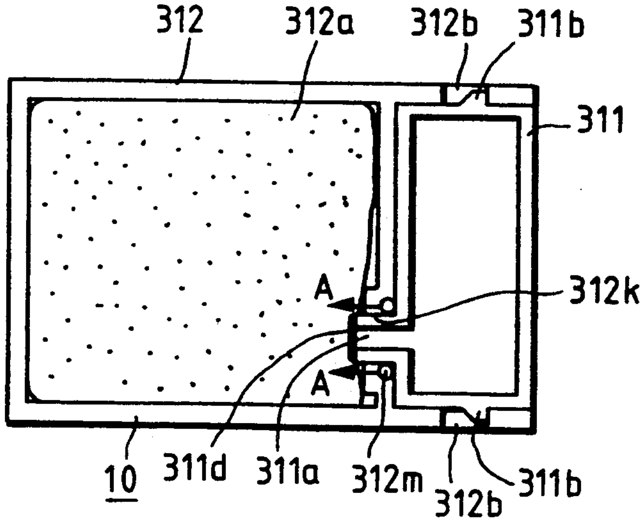
FIG. 17 is a schematic sectional view for illustration of the internal constitution of the recording head shown in FIGS. 16A to 16C.
Figure 18B:
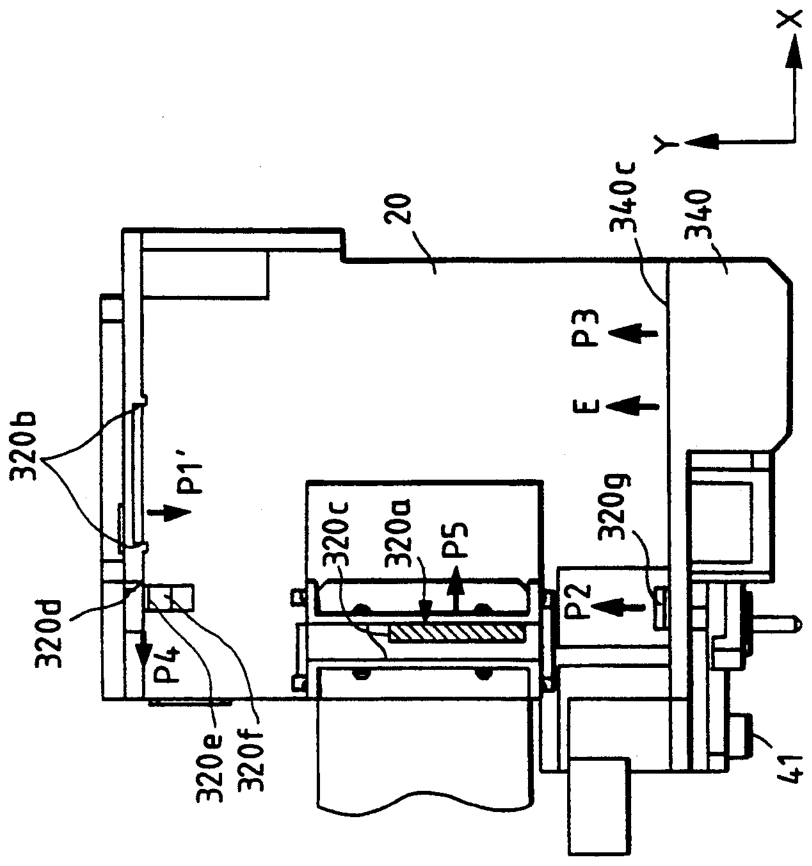
FIGS. 18A to 18C are, respectively, a perspective view, a top view and a back view showing schematically the constitution of the carriage for mounting its recording head.
Figure 18A:
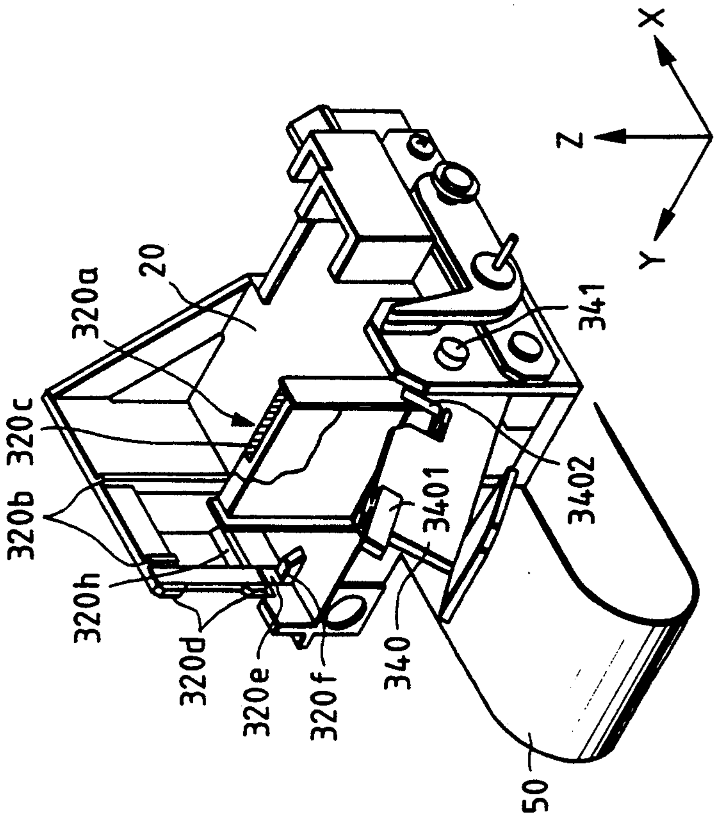
Figure 18C:
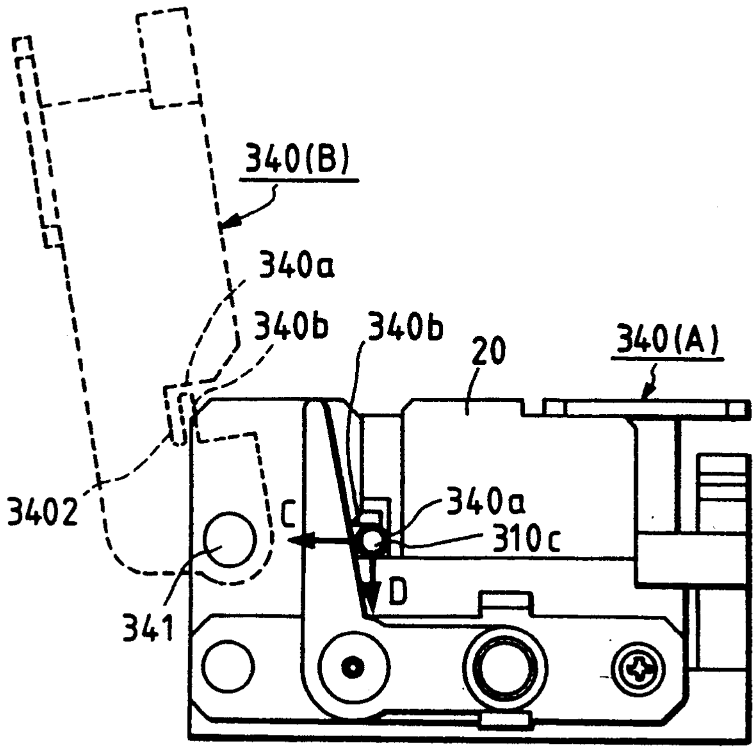

FIG. 15 is a schematic perspective view of the ink jet recording device (ink jet printer) according to the embodiment of the present invention. FIG. 16A is a schematic perspective view of an ink tank integrated type recording head cartridge (recording head) to be mounted on the printer as viewed from the bottom side, FIG. 16B is a schematic perspective view of the same as viewed from the top side, FIG. 16C is a schematic bottom view of the same, and FIG. 17 is a schematic sectional view of the same. FIG. 18A is a schematic perspective view showing a constitutional example of the carriage as the mounting member for mounting the recording head, FIG. 18B and FIG. 18C are respectively a schematic top view and a schematic back view of the same.

By use of these Figures, the outline of the embodiment of the present invention is described.

First, in FIG. 15, the carriage 20 having the recording head 10 mounted thereon is guided along the paper delivery roller 60 by the guide shaft 70, the recording head 10 discharges ink toward the surface of the recording paper P as the recording medium, and forms an image with the attached ink droplets, thereby performing recording. Numeral 30 is the discharge restoration means located at, for example, the home position of the carriage 20. This is constituted of a cap 31 comprising an elastic material such as rubber, etc. provided for protecting the discharge port by covering over the discharge port and also preventing clogging of ink by prevention of drying of the discharge port vicinity including the discharge port, and a suction pump 33 communicated to the cap 31 through an elastic tube 32. And, by sucking ink and/or air through the discharge port by reducing the pressure internally of the cap 31 with the pump 33 to remove factors for causing defective discharge such as thickened ink, bubbles, etc., the discharging state of ink can be made good. The carriage 20 is located at the home position as the non-recording position except when the recording head 10 performs recording, so that the discharge port may be protected there with the cap 31. And, in this embodiment, the constitution is made so that attachment and detachment of the recording head 10 must be performed necessarily at the home position. The above constitution is substantially the same as in the first and the second embodiments as described above.

Next, by referring to FIGS. 16A through 16C and FIG. 17, the constitution of the recording head is described. In this embodiment, the recording head 10 is constituted of a recording head element 311 and an ink tank 312 which are integrated.

Here, the recording head element 311 is provided, as the energy generation means for generating the energy to be utilized for discharging ink, with a discharging portion 311*d* having an ink discharge port on the front surface by use of an electrothermal transducer in the form which acts thermal energy on ink corresponding to current passage. As the energy generation means, otherwise an electromechanical transducing element, etc. can be also employed. However, the constitution is made in this embodiment by use of an electrothermal transducer, because the preparation steps are simple, the production cost is low and also high density integration of discharging ports or liquid channels communicated thereto can be effected, and a plurality of discharging ports and liquid channels communicated thereto are provided, with arrangements of electrothermal transducers in the respective liquid channels.

Numeral 311*e* is a connecting terminal having the electrode portion for supplying electrical signals to the electrothermal transducer, and in this embodiment, for example, it has dimensions of X=30 mm and Y=10 mm in FIG. 16A and arranged within the head element housing portion 310*a* opened on the recording head 10 side, whereby contamination of the connecting terminal 311*e* with ink, etc., occurrence of damage, abrasion, deformation, dust attachment by touching with hands of the operator during handling, breaking of the electrothermal transducer by electrostatic charges are further prevented. This positional relationship is different from the embodiments in the foregoing first and second embodiments. Numeral **310*b* is a guide member acting as the impeding portion which guides the recording head 10 onto the carriage 20 during mounting, and in this embodiment the extended length is made L=3 mm (see FIG. 16C) and 310*c* is a fixing pin which forms the auxiliary projection for positioning receiving the urging force for fixing the recording head by engagement with the fixing lever 340 provided rotatably on the carriage 20 as described later by referring to FIGS. 18A to 18C. This pin may be also provided behind the base plate 313** integrally therewith, and with such constitution, further precision can be ensured.

Numerals **310*d*, 310*e* and 310*f* are positioning portions which form the respective standard faces in the x direction, y direction and z direction crossed perpendicularly to one another in FIGS. 16A to 16C, for fixing the recording head 10 to a predetermined position of the carriage 20 by contacting the standard face of the carriage 20**.

The respective faces **310*d*, 310*e* and 310*f* in these x, y and z directions are provided integrally on the base plate 313 which forms the supporting member of the discharging portion 311*d* of the recording head 10, which are arranged substantially linearly to ensure readily precision in production. Also, these are provided at the position which hands, etc. of the operator can hardly touch during handling as described later, namely below the discharging portion 311*d*, whereby damage, deformation, and dust attachment will occur with difficulty. Further, by provision of these standard faces on the base plate 313 nearby the discharging portion 311*d*, the positioning precision of the discharging portion 311*d* during mounting onto the carriage 20 can be well ensured. More specifically, in this embodiment, by providing the positioning portions 310*d* to 310*f* inside of the boundary of the space formed by the boundary obtained by connecting mutually the ends on the side where the discharging portion 311*d* is positioned (a–g, j in FIGS. 16A, 16B), it becomes possible to effect positioning accurately even if falling or contamination may occur because of inconveniences in operation. The base plate 313 can be formed of, for example, aluminum, etc. and has the function of dissipating heat as the heat dissipating plate for inhibiting temperature elevation of the recording head 10 accompanied with driving of the electrothermal transducer. The upper and lower portions forming the standard face 310*d* (see FIG. 16B) are to regulate the slanting of the recording head 10, and the span (interval) should be preferably 15 mm or longer in this embodiment, and hence it was made 16 mm in this embodiment. However, this can be selected to an adequate value depending on the size of the device. Also, if regulation of the slanting poses no problem, the standard face 310*d*** may be also one.

Referring to FIG. 17, for introducing ink from the ink tank 312 to the recording head element 311 side, the communication pipe **311*a* penetrates internally through the feeding inlet 312*k* of the ink tank 312. Also, the introducing inlet at its tip end is provided with a filter 311*d*, whereby penetration of bubbles, etc. from the ink tank 3110** is impeded.

In connecting the head element 311 and the ink tank 312, the head element 311 is urged into the ink tank 312 in the direction shown by the arrowhead A in FIG. 17. At this time, the wall portion provided with the opening **312*b* of the ink tank 312 is expanded outwardly due to engagement of the projection 311*b* provided on the head element 311 with the tapered surface, and simultaneously the communication pipe 311*a* is penetrated into the feeding inlet 312*k*.**

And, when the projection **311*b* and the opening 312*b* reach the positions where they are completely opposed to each other, the wall portion is restored to the original position through its spring characteristic, and the projection 311*b* is fitted into the opening 312*b* to obtain the mounted state as shown in FIG. 17. On the other hand, the communication pipe 311*a* becomes the state with the introducing inlet at its tip end pressure contacting the absorber 312*a* impregnated with ink, whereby good ink communication can be obtained. In FIG. 17, 312*m* is an O ring as the sealing material which ensures ink sealing at the feeding inlet 312*k*** portion.

According to the constitution as described above, only by pushing the head element 311 relative to the ink tank 312 in the direction shown by the arrowhead A in FIG. 17, connection of the both can be effected without requiring any step such as adhesion, etc. Also, since the communication pipe **311*a* provided on the head element 311 side is permitted to penetrate into the ink tank 312 so that its tip end may pressure contact the ink absorber 312*a*,** ink communication can be ensured.

In the constitution as described above, the projection **311*b* is provided on the head element side, and also the opening 312*b* provided on the wall portion of the ink tank 312 so as to effect engagement between the projection 311*b* and the opening 312*b* by utilizing flexibility or elasticity of the wall portion in mounting, but the constitution at this portion can be determined as desired. For example, in place of forming the wall portion with flexibility, even if this may be slightly rigid, the constitution may be made such that the projection 311*b* is supported with a spring, etc. so as to be urged in the direction projected outwardly and fitted into the opening 312*b* through the urging force of the spring when the projection 311*b* is retreated inwardly accompanied with the mounting actuation as described above and opposed to the opening 312*b*.**

Whereas, in this embodiment, since the head element 311 is constituted to have a base plate 313 extending relatively longer integrated therewith, the mounting actuation including positioning can be made easier by utilizing this portion, and the mounted state can be made surer.

Referring again to FIG. 16C, in this embodiment, the face of the abutting member **312*c* arranged on the element housing portion 310*a* of the ink tank 312 against which the rear end brim 313*c* of the base plate 313 is abutted is formed to a tapered surface. And, in the abutted state as shown, registration between the projection 311*b* and the opening 312*b* or registration between the communication pipe 311*a* and the opening 312*k*** is effected.

Thus, in mounting the head element 311 onto the ink tank 312, by first abutting the rear end brim **313*c* of the base plate 313 against the tapered face of the abutting member 312*c*, and performing the actuation as described above by referring to FIG. 17 under this state, it becomes possible to effect connection between the head element 311 and the ink tank 312. Also, since not only joining can be effected by fitting of the projection 311*b* into the opening 312*b*, but also the rear end side 313*c* of the base plate 313 can be pushed against the ink tank by the tapered face of the abutting member 312c**, the mounted state can be made surer.

Further, employment of such constitution of the abutting portion is advantageous with respect to working precision and with respect to difficulty of occurrence of the position disturbance with burr, as compared with the case of forming this in a right angle hook form.

Next, by referring to FIGS. 18A through 18C the constitution of the carriage 20 according to this embodiment is described.

In these Figures, 320a is a connecting terminal which is the power supplying portion bonded to the connecting terminal 311e of the recording head 10, 320b is the guide rail which forms the sliding portion for guiding the guide member 310b during mounting of the recording head 10 to guide the recording head to a predetermined position, and 320c is an elastic member for giving an appropriate pressure contact force (e.g. 20 to 50 g per 1 pad) during bonding of the connecting terminals 311e and 320a, for which chloroprene rubber, urethane rubber, moltprene rubber etc. may be preferably used for having appropriate modulus.

Numeral 340 is the fixed lever for performing the operation to fix the head 10 to the carriage 20, and axially supported rotatably on the carriage 20 by the shaft 341. And, the fixing lever 340, at the fixing position of the recording head 10 (the position of 340(A) shown by the solid line in FIG. 18C), pushes the fixing pin 310c provided on the recording head 10 in the direction C in FIG. 18C with the pressing face 340a of the portion 3402, and similarly in the direction D with the pressing face 340b of the portion 3402, thereby urging the recording head 10 against the fixing position. Also, during mounting, the recording head 10 is pressed in the direction E in FIG. 18B with the lower side brim 340c of the fixing lever 340. Numeral 3401 is the portion for fixing the lever 340 to the carriage during head mounting.

Numerals 320d, 320e and 320f are positioning receiving portions which form the respective standard faces for positioning the recording head on a predetermined position on the carriage 20, and become the positioning standards in the x direction, y direction and z direction. That is, positioning in the x direction is effected by contacting of the x direction standard face 320d of the carriage 20 with the x direction standard face 310d provided on the base plate 313 of the recording head 10. Similarly, the positioning in the y direction is effected by contacting of the y direction standard face 320e of the carriage 20 with the y direction standard face 310e of the recording head 10, and the positioning in the z direction by contacting of the z direction standard face 320f of the carriage 20 with the z direction standard face of the recording head 10.

Numeral 320g is the pressing portion for pressing the recording head 10 for contacting of the y direction standard faces 310e and 320e and 320h is the pressing portion for pressing the recording head 10 for contacting of the z direction standard faces 310f and 320f, which forms the engagement receiving portion.

In FIG. 18A, 50 is a flexible cable to be used for transmitting driving signals from the control circuit of the device main body to the recording head 10, etc.

Figure 19:
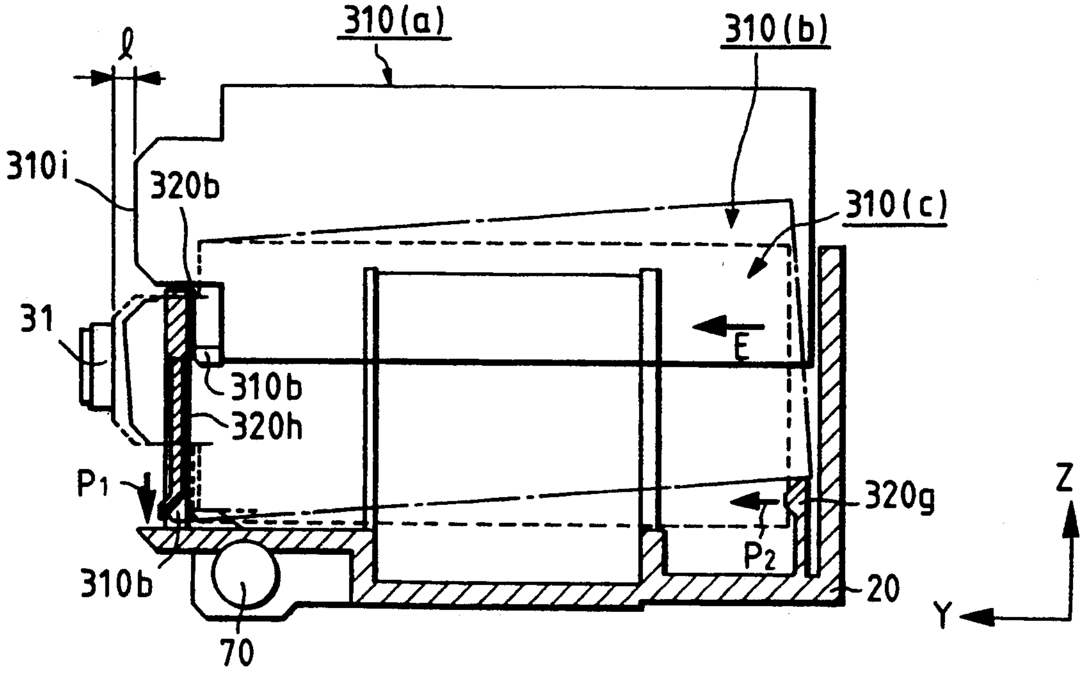
FIGS. 19 to 22C are schematic illustrations for explanation of the actuation during mounting of the head according to the third embodiment onto the carriage.
Figure 20A:
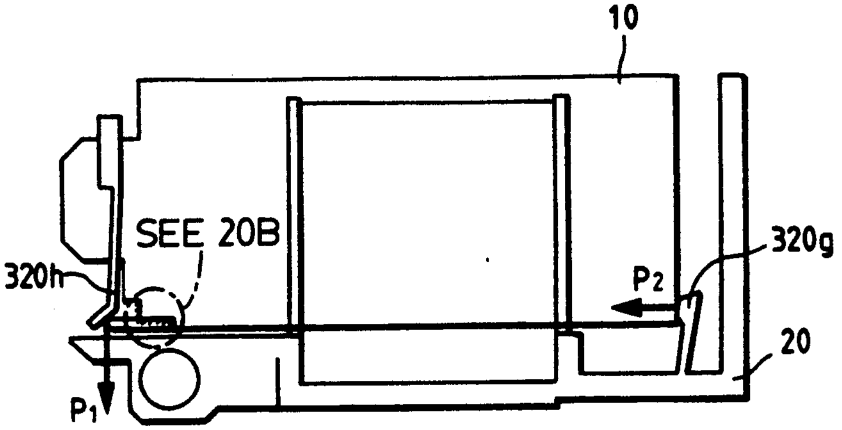
Figure 20A:
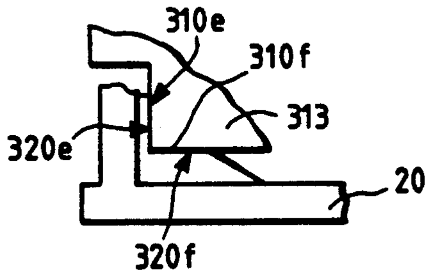
Figure 20B:
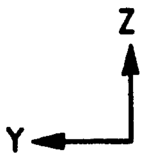

Mounting actuation of the recording head 10 onto the carriage 20 is described primarily with respect to the y direction and the z direction by use of FIG. 19 and FIG. 20.

First, the recording head 10 is set at a predetermined position on the carriage 10 where the guide member 310b is guided by the guide rail 320b, and mounting is begun from this position (the position of 310(*a*) in FIG. 19).

In this embodiment, mounting actuation is done at the home position where the discharge port surface is opposed to the cap 31, but at this time, a predetermined distance l (2 mm in this embodiment) is ensured between the discharge port surface 310i of the recording head 10 and the cap 31 with extension L=33 of the guide member 310b (see FIG. 16C), whereby the inconvenience of contacting of the recording head 10 with the cap 31 can be prevented.

As the recording head 10 is slid downward under the state with the guide member 310b being guided by the guide rail 320b, the recording head 10 is mounted to the position shown by 310(*b*) in FIG. 19. At this time, the rear end side of the recording head 10 becomes the state stopped by engagement at the upper end of the pressing portion 320g, whereby further mounting is once impeded.

When the fixing lever 340 is operated from the position of 340(B) shown by the broken line in FIG. 18C to the position of 340(A), the recording head 10 is pushed out in the E direction in FIG. 19 (y direction) with the pressing force $P_3$ (see FIG. 18B) given by the lower side brim 340c of the fixing lever 340, and also pushed down in the direction D in FIG. 18C with the pressing force of the pressing face 340b. By this, the rear end of the recording head 10 comes beyond the pressing portion 320g to be set at the position shown by 310(C) in FIG. 19, thus completing the mounting actuation of the recording head 10.

At this time, as shown in FIG. 19 and FIG. 20, on the recording head 10 acts the force $P_1$ from the tapered portion of the pressing portion 320h through the guide member 310b to press the recording head tip end portion elastically toward the carriage bottom side. Also, the force $P_1'$ acts from the front surface toward the rear end (see FIG. 18B), and also the force $P_2$ acts from the pressing portion 320g through the recording head rear end side, whereby the recording head 10 is pressed elastically toward the cap 31 side. By this, the y direction standard face 310e of the base plate 313 of the recording head 10 and the z direction standard face 310f, the y direction standard face 320e of the carriage 20 and the z direction standard face 320f come into contact, respectively, whereby positioning with respect to the y direction and the z direction of the recording head 10 is effected.

Next, the mounting actuation of the recording head 10 onto the carriage 20 is described primarily with respect to the x direction by use of FIGS. 21A and 21B, and FIGS. 7A to 7C.

Figure 21A:
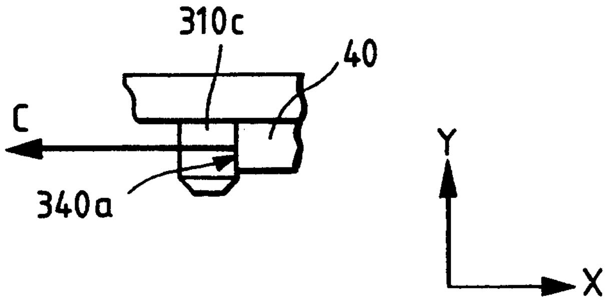
Figure 21B:
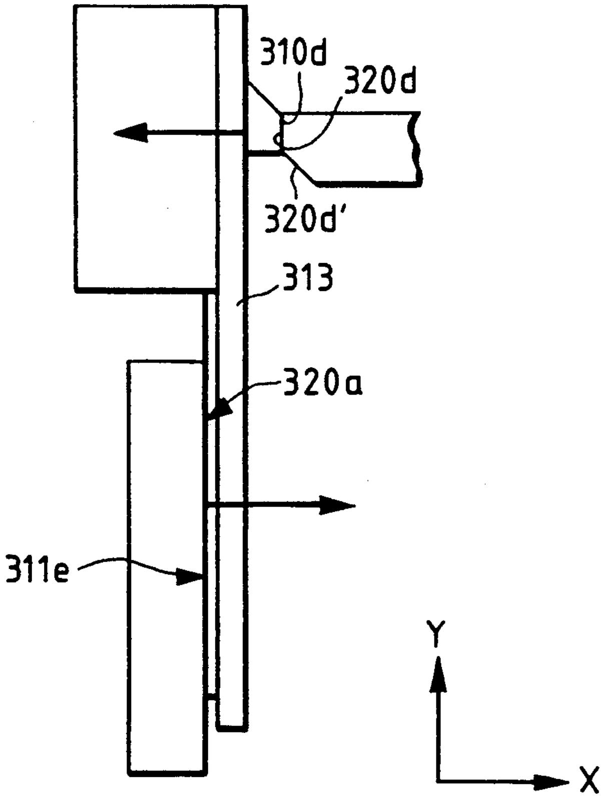

As shown in FIG. 21A, as accompanied with the operation of the fixing lever 340, its pressing face 340a is engaged with the fixing pin 310c, to act urging force in the c direction. On the other hand, on the fixing pin 310c acts the force in the D direction with the pressing face 340b (see FIG. 18C) and also the force in the E direction acts from the rear end of the recording head 10. By the action of the force in the E direction, the recording head 10 moves in the y direction, as shown in FIG. 21(B) whereby the portion of the base plate 313 provided with the positioning standard face 310d in the x direction comes beyond the tapered face 320d of the portion provided with the positioning standard face 320*d* of the carriage 20, thus effecting positioning in the x direction of the recording head 10 through opposed contact of the both standard faces 310*d*, 320*d* on completion of mounting.

At this time, since the force acts on the recording head 10 from the carriage 20 side through the fixing pin 310*c* and the x direction standard face 310*d*, the terminals end 311*e* and the 320*a* come into contact under pressed state.

Figure 22A:
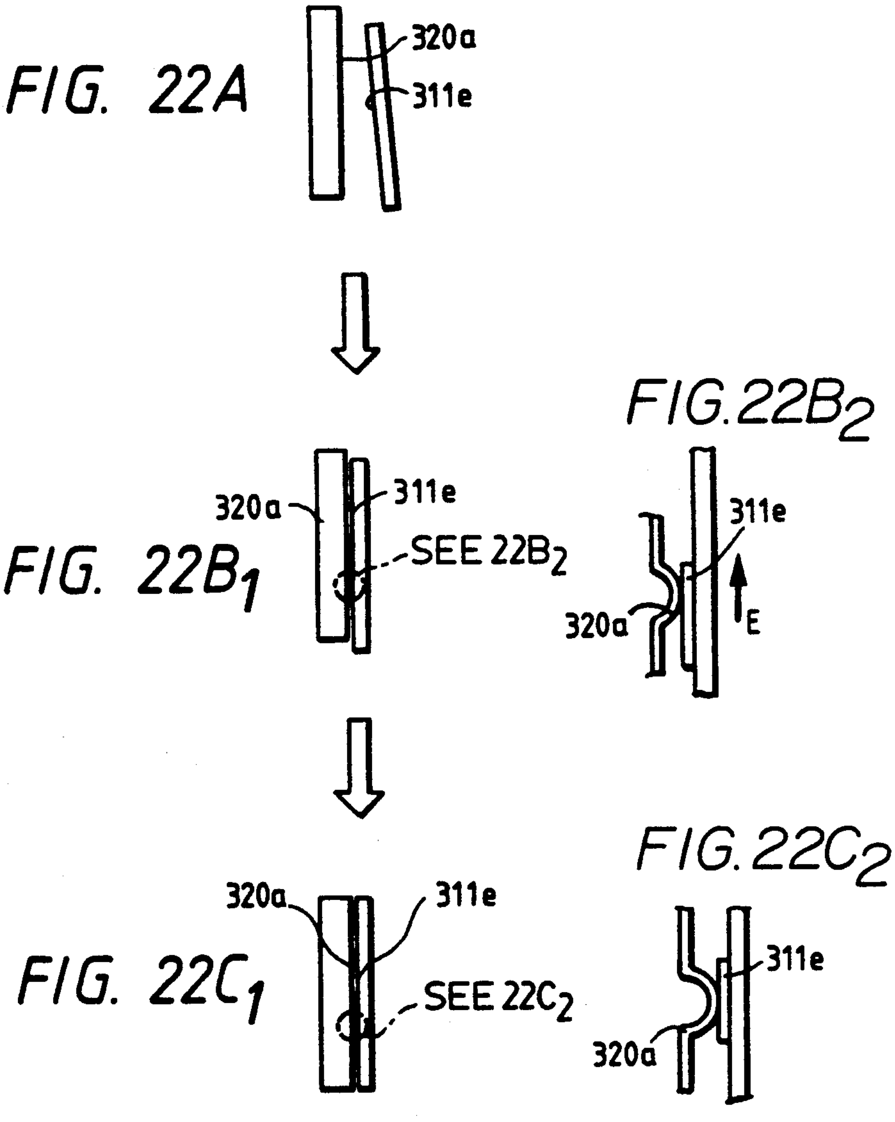

Here, the process reaching connection between the connecting terminals 311*e* and 320*a* is described by use of FIGS. 22A to 22C. The states 22[A] to 22[C] in the Figures correspond to the respective states 310[*a*] to 310[*c*] of the recording head 10 in FIG. 19.

First, in the process reaching from the state of 310(*a*) to the state of 310[*b*] in FIG. 19, the terminals 11*e*, 20*a* are in the positional relationship shown by 310[*a*] in FIGS. 22A to 22C, and are not in contact with each other.

As the process from the state 310[B] to the state 310[C] in FIG. 19 proceeds, namely as the fixing lever 340 is operated, the state becomes as shown in FIG. 22B, whereby the terminals 311*e*, 320*a* begin to come into contact with each other. At the same time, the terminal 311*e* slides on the terminal 320*a* in the same direction, as accompanied with the movement of the recording head 10 in the E direction. Therefore, in this process, even if coating or foreign matter due to ink contamination may exist or protective film may be provided, these can be scraped off to refresh the contact surface. Also, since said sliding is performed mutually one to one corresponding pads in the vicinity of their connected position, the risk of damaging terminals can be markedly reduced.

And, when mounting is completed as shown by 310[c] in FIG. 19, the terminals 311*e*, 320*a* become the state as shown in FIG. 22C, whereby a good connected state is obtained at the predetermined position.

Also, the discharging surface of the discharge portion 311*d* is bonded for the first time to the cap 31, whereby damaging of both during the mounting process can be prevented, and quick protection of the discharging surface after mounting can be effected.

As described above, according to this embodiment, in connecting the connecting terminals, electrical connection can be effected with the optimum force without damaging terminals, and which can refresh their surfaces, and also it becomes possible to mount the recording head including said connection by way of simple actuation, and yet sure positioning and protection of the discharge portion can be also done on completion thereof.

We claim:

1. A recording head cartridge having an integral recording head and ink tank, wherein said cartridge is removably mountable to a carriage of a recording apparatus, the carriage having a receiving portion and an electrical connecting terminal, said cartridge having a main body comprising:

an electrode portion formed on a side surface of a concavity of said main body for receiving driving signals through the electrical connecting terminal;

a recording portion including an ink discharge port surface;

a positioning portion provided adjacent said recording portion, said positioning portion being disposed for positioning said recording portion onto the carriage through engagement with the receiving portion; and an impeding portion for impeding electrical connection of said electrode portion with the electrical connecting terminal and also impeding engagement of said positioning portion with the receiving portion, wherein the electrical connection and the engagement of said positioning portion and the receiving portion are completed when said impeding portion comes into a concavo-convex engagement with the carriage.

2. A recording head cartridge according to claim 1, further comprising a base plate for holding said recording head, wherein said positioning portion has first and second projections located at different positions with respect to a mounting direction of said main body, and said recording head is held at a predetermined angle by positioning of said first and second projections onto the carriage.

3. A recording head cartridge according to claim 2, wherein said recording portion has an electrothermal transducer as a discharge energy generating element, said base plate is formed of a metal for dissipating heat, and said positioning portion is provided only on said base plate.

4. A carriage of an ink jet recording device for mounting a detachable ink jet recording head, said carriage comprising:

a receiving portion for receiving a positioning portion provided on a recording portion side of the recording head;

a protruded portion for insertion into a concavity of the recording head, said protruded portion being equipped with an electrical connecting terminal to be connected electrically to an electrode portion within the concavity of the recording head;

a sliding portion for inhibiting engagement of the positioning portion of the recording head with said receiving portion and also for impeding electrical connection during the mounting of the recording head;

an engaging receiving portion for allowing the engagement of the positioning portion of the recording head with said receiving portion and electrical connection through concavo-convex engagement with the recording head; and holding means for maintaining a mounting position of the recording head when it is mounted to said carriage.

5. A carriage according to claim 4, wherein said receiving portion and said electrical connecting terminal transmit urging forces with different directions to the positioning portion and the electrode portion, respectively, of the recording head when the recording head is mounted to said carriage.

6. A carriage according to claim 4, further comprising an elastic portion for temporarily impeding movement of the recording head relative to a direction in which the concavity of the recording head receives said protruding portion, and also for generating an elastic force in a direction in which the positioning portion is engaged with said receiving portion when the recording head is urged in a different direction.

7. A carriage according to claim 6, wherein said holding means includes an operation lever for aiding the mounting by generating the urging forces, and said operation lever includes an engaging portion which is engaged with an end of the recording head to permit the recording head to move in the different direction.

8. A carriage according to claim 7, wherein said operation lever is positioned at an extended position relative to the positioning portion and the electrode portion of the recording head and includes an engaging portion which holds the recording head at a predetermined position through engagement with a projection provided on a side of the recording head opposite to the positioning portion.

9. A carriage according to claim 6, wherein said elastic portion engages a relative sliding portion on a side of the recording head through elastic force, and said holding means includes a second elastic portion which maintains the concave-convex engagement by imparting an elastic force to the relative sliding portion.

10. An ink jet recording device equipped with an ink jet recording head and with a cap for covering an ink discharge port at a recording portion of the recording head, said device having a carriage positionable at a mounting position for mounting the recording head at a position opposed to the cap, said carriage comprising:

- a guide portion for guiding the recording head while maintaining a gap between the cap and the recording portion during the mounting of the recording head onto said carriage in the mounting position;
- an engaging portion for engaging the recording head to said carriage in a concavo-convex engagement and permitting the recording portion to engage with the cap substantially simultaneously when the recording head is completely mounted on said carriage, said engaging portion being provided adjacent to an area where said guide portion is provided; and
- recording head holding means equipped with an elastic portion for ensuring the engagement of said engaging portion by imparting an elastic force.

11. An ink jet recording device according to claim 10, wherein said holding means includes an operation lever for aiding in the mounting of the recording head, said elastic portion being provided at a site for impeding movement of the recording head to a positioning region, said operation lever being disposed for imparting an urging force for moving the recording head toward the cap, and causing elastic deformation of said elastic portion corresponding to the movement of the recording head by the urging force.

12. An ink jet recording device according to claim 10, wherein said carriage has an electrical connecting terminal projection for joining to an electrode portion of the recording head by progressing into a concavity for the electrode portion, said guide portion guides the electrode portion under an electrically disconnected state relative to said electrical connecting terminal, and said engaging portion affords substantially simultaneously mounting of the recording head onto a positioning region, adhesion of the cap to said recording portion and electrical connection of said electrical connecting terminal to the electrode portion.

13. An ink jet recording device according to claim 12, wherein said holding means temporarily impedes movement of the recording head relative to a first direction in which the concavity of the recording head receives said projection of said carriage, and also includes an elastic portion which imparts an elastic force in a direction in which a positioning portion of the recording head is engaged with a receiving portion of said carriage when the recording head is urged in a second direction different from the first direction.

14. An ink jet recording device according to claim 13, wherein said holding means includes an operation lever for aiding mounting in urging the recording head, and said operation lever includes an engaging portion which moves the recording head in the second direction through engagement with an end of the recording head.

15. An ink jet recording device according to claim 14, wherein said operation lever is positioned at an extended position relative to the positioning portion of the recording head to be mounted and the electrode portion, and includes an engaging portion which holds the recording head at a predetermined position through engagement with a projection provided on a side of the recording head opposite to the positioning portion.

* * * * *

UNITED STATES PATENT AND TRADEMARK OFFICE
CERTIFICATE OF CORRECTION

PATENT NO. : 5,245,361

DATED : September 14, 1993

INVENTOR(S) : MAKOTO KASHIMURA ET AL. Page 1 of 4

It is certified that error appears in the above-identified patent and that said Letters Patent is hereby corrected as shown below:

ON THE TITLE PAGE

Item [54] and column 1, line 2, "MOUNTAIN" should read --MOUNTING--.

COLUMN 1

Line 2, "MOUNTAIN" should read --MOUNTING--.
Line 45, "a" should be deleted.

COLUMN 2

Line 25, "of all" should read --or all--.

COLUMN 3

Line 34, "FIGS. 5A to 5E." should read --FIGS. 7A to 7E.--.
Line 40, according," should read --according--.

COLUMN 5

Line 58, "10C" should read --10c--.

COLUMN 6

Line 4, "1" should read --10--.
Line 29, "taking" should be deleted.
Line 52, "surface 10" should read --surface--.
Line 56, "1." should read --10.--.

UNITED STATES PATENT AND TRADEMARK OFFICE

CERTIFICATE OF CORRECTION

PATENT NO. : 5,245,361

DATED : September 14, 1993

INVENTOR(S) : MAKOTO KASHIMURA ET AL.

It is certified that error appears in the above-identified patent and that said Letters Patent is hereby corrected as shown below:

COLUMN 7

Line 62, "describe" should read --described--.

COLUMN 8

Line 11, "hopped" should read --popped--.
Line 41, "enough" should read --sufficient--.
Line 43, "recording" should read --recording head--.

COLUMN 9

Line 45, "embodiments" should read --embodiment--.

COLUMN 10

Line 23, "1" should read --10--.
Line 49, "the connecting terminal 10a," should be deleted.
Line 50, "20a" should be deleted and "an terminal)" should read --an adequate pressure contact force (20 to 50 g per one terminal)--.
Line 61, "hop-up" should read --pop-up--.

COLUMN 11

Line 14, "1." should read --10.--.

UNITED STATES PATENT AND TRADEMARK OFFICE
CERTIFICATE OF CORRECTION

PATENT NO. : 5,245,361

DATED : September 14, 1993

INVENTOR(S) : MAKOTO KASHIMURA ET AL.

It is certified that error appears in the above-identified patent and that said Letters Patent is hereby corrected as shown below:

COLUMN 12

Line 52, "hopped" should read --popped--.
Line 55, "and" should read --if-- and "if" should be deleted.
Line 56, "the" should read --and the--.

COLUMN 14

Line 64, "rebording" should read --recording--.

COLUMN 15

Line 28, "of the cartridge" (second occurrence) should be deleted.

COLUMN 16

Line 50, "otherwise" should be deleted.

UNITED STATES PATENT AND TRADEMARK OFFICE
CERTIFICATE OF CORRECTION

PATENT NO. : 5,245,361

DATED : September 14, 1993

INVENTOR(S) : MAKOTO KASHIMURA ET AL.

It is certified that error appears in the above-identified patent and that said Letters Patent is hereby corrected as shown below:

COLUMN 17

Line 65, "3110" should read --312--.

COLUMN 23

Line 15, "convave-convex" should read --concavo-convex--.

Signed and Sealed this

Twenty-fifth Day of October, 1994

Attest:

Bruce Lehman

BRUCE LEHMAN

Attesting Officer

*Commissioner of Patents and Trademarks*